US009110353B2

(12) United States Patent
Shintani

(10) Patent No.: US 9,110,353 B2
(45) Date of Patent: Aug. 18, 2015

(54) FOCAL PLANE SHUTTERING APPARATUS AND IMAGE CAPTURE DEVICE

(71) Applicant: Panasonic Corporation, Osaka (JP)

(72) Inventor: Dai Shintani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 51 days.

(21) Appl. No.: 14/177,301

(22) Filed: Feb. 11, 2014

(65) Prior Publication Data

US 2014/0168457 A1 Jun. 19, 2014

Related U.S. Application Data

(63) Continuation of application No. PCT/JP2012/005341, filed on Aug. 24, 2012.

(30) Foreign Application Priority Data

Aug. 24, 2011 (JP) .................................. 2011-182396
Oct. 13, 2011 (JP) .................................. 2011-225592

(51) Int. Cl.
*G03B 9/08* (2006.01)
*G03B 9/40* (2006.01)
(Continued)

(52) U.S. Cl.
CPC .. *G03B 9/08* (2013.01); *G03B 9/20* (2013.01); *G03B 9/40* (2013.01); *G03B 9/42* (2013.01); *H04N 5/23245* (2013.01)

(58) Field of Classification Search
CPC .............. G03B 9/08; G03B 9/42; G03B 9/20; G03B 9/40; H04N 5/23245
See application file for complete search history.

(56) References Cited

U.S. PATENT DOCUMENTS 4,975,722 A * 12/1990 Suzuki et al. .................. 396/456
6,390,691 B1 * 5/2002 Nakagawa ..................... 396/357
(Continued)

FOREIGN PATENT DOCUMENTS

CN 101364028 A 2/2009
CN 101435974 A 5/2009
(Continued)

OTHER PUBLICATIONS

International Search Report for corresponding International Application No. PCT/JP2012/005341 mailed Nov. 27, 2012.
(Continued)

*Primary Examiner* — Twyler Haskins
*Assistant Examiner* — Padma Haliyur
(74) *Attorney, Agent, or Firm* — Renner, Otto, Boisselle & Sklar, LLP

(57) ABSTRACT

This focal plane shuttering apparatus includes: front and rear curtains; first and second elastic members which generate biasing force to make the front and rear curtains run in such a direction as to get the front and rear curtains retracted from an aperture; a charging member which applies biasing force to those elastic members; a front curtain locking member which keeps the front curtain retracted from the aperture when the charging member applies biasing force to the first elastic member; a rear curtain locking member which keeps the aperture covered with the rear curtain when the charging member applies biasing force to the second elastic member; two switches which turn synchronously with those locking members; and an unlocking member which is interlocked with the charging member that unlocks those locking members.

10 Claims, 20 Drawing Sheets

(51) Int. Cl.
  *H04N 5/232* (2006.01)
  *G03B 9/20* (2006.01)
  *G03B 9/42* (2006.01)

(56) References Cited

U.S. PATENT DOCUMENTS

| | | | |
|---|---|---|---|
| 6,749,348 B2 * | 6/2004 | Seita | 396/443 |
| 7,708,480 B2 * | 5/2010 | Yoshida et al. | 396/510 |
| 2004/0018015 A1 | 1/2004 | Seita | |
| 2009/0041447 A1 | 2/2009 | Kim et al. | |
| 2010/0026881 A1 * | 2/2010 | Kim | 348/362 |
| 2010/0027987 A1 * | 2/2010 | Tanaka et al. | 396/465 |
| 2010/0067897 A1 * | 3/2010 | Sakai | 396/484 |
| 2011/0164871 A1 | 7/2011 | Shintani | |
| 2011/0176799 A1 * | 7/2011 | Shintani | 396/484 |

FOREIGN PATENT DOCUMENTS

| | | |
|---|---|---|
| JP | 59-001026 B | 1/1984 |
| JP | 07-209695 A | 8/1995 |
| JP | 2002-090806 A | 3/2002 |
| JP | 2004-061865 A | 2/2004 |
| JP | 2004-138690 A | 5/2004 |
| JP | 2007-155773 A | 6/2007 |
| JP | 2007-316503 A | 12/2007 |
| JP | 2011-013540 A | 1/2011 |
| JP | 2011-158890 A | 8/2011 |

OTHER PUBLICATIONS

Co-pending U.S. Appl. No. 14/177,317, filed Feb. 11, 2014.
Co-pending U.S. Appl. No. 14/177,360, filed Feb. 11, 2014.
Chinese Search Report (with English translation) for corresponding Chinese Patent Application No. 201280004427.8, dated Apr. 3, 2015.

\* cited by examiner

100

FOCAL PLANE SHUTTERING APPARATUS AND IMAGE CAPTURE DEVICE

This is a continuation of International Application No. PCT/JP2012/005341, with an international filing date of Aug. 24, 2012, which claims priority of Japanese Patent Applications No. 2011-182396, filed on Aug. 24, 2011 and No. 2011-225592, filed on Oct. 13, 2011, the contents of which are hereby incorporated by reference.

BACKGROUND

1. Technical Field

The present application relates to a focal plane shuttering apparatus for use in an image capture device which can capture either still pictures or movies.

2. Description of the Related Art

Japanese Laid-Open Patent Publication No. 2004-061865 discloses a focal plane shutter which can change from a normally closed state into a normally opened state, and vice versa. To make a digital single lens reflex camera realize a live view function, according to Japanese Laid-Open Patent Publication No. 2004-061865, the front and rear curtains of the focal plane shutter are charged with a curtain charging actuator, and then the front curtain is kept in a running finished state by getting it mechanically locked in its camera body.

This focal plane shuttering apparatus separates a front curtain charging setting lever from a driving member which is coupled to the front curtain and keeps the driving member in the running finished state when the setting lever is in the charged state, thereby realizing a normally opened state.

On the other hand, Japanese Laid-Open Patent Publication No. 2007-316503 discloses a shuttering apparatus which makes only the rear curtain run by using an electronic front curtain shuttering function after an image sensor has reset electric charges. In this shuttering apparatus, a rear curtain charging setting member and a driving member coupled to the rear curtain are separated from each other and a locking member is provided to lock the driving member and keep it in the running finished position, thereby realizing a normally opened state. Also, according to Japanese Laid-Open Patent Publication No. 2007-316503, the locking member is unlocked by driving the setting member, thereby carrying out electronic front curtain shutter shooting.

SUMMARY

The present disclosure provides a focal plane shuttering apparatus and image capture device which can control a normally opened/closed switching shutter more easily.

A focal plane shuttering apparatus according to the present disclosure includes: a shutter base plate with an aperture; a front curtain which is movable between a position where the front curtain covers the aperture and a position where the front curtain is retracted from the aperture; a first elastic member which generates biasing force to make the front curtain run in such a direction as to get the front curtain retracted from the aperture; a rear curtain which is movable between a position where the rear curtain covers the aperture and a position where the rear curtain is retracted from the aperture; a second elastic member which generates biasing force to make the rear curtain run in such a direction as to have the rear curtain cover the aperture; a charging member which applies biasing force to the first and second elastic members; a front curtain locking member which keeps the front curtain retracted from the aperture when the charging member applies biasing force to the first elastic member; a first switch which turns synchronously with the front curtain locking member; a rear curtain locking member which keeps the aperture covered with the rear curtain when the charging member applies biasing force to the second elastic member; a second switch which turns synchronously with the rear curtain locking member; and an unlocking member which is interlocked with the charging member that unlocks the front and rear curtain locking members.

An exemplary embodiment of the present disclosure provides a focal plane shuttering apparatus and image capture device which can control a normally opened/closed switching shutter more easily.

Figure 20:
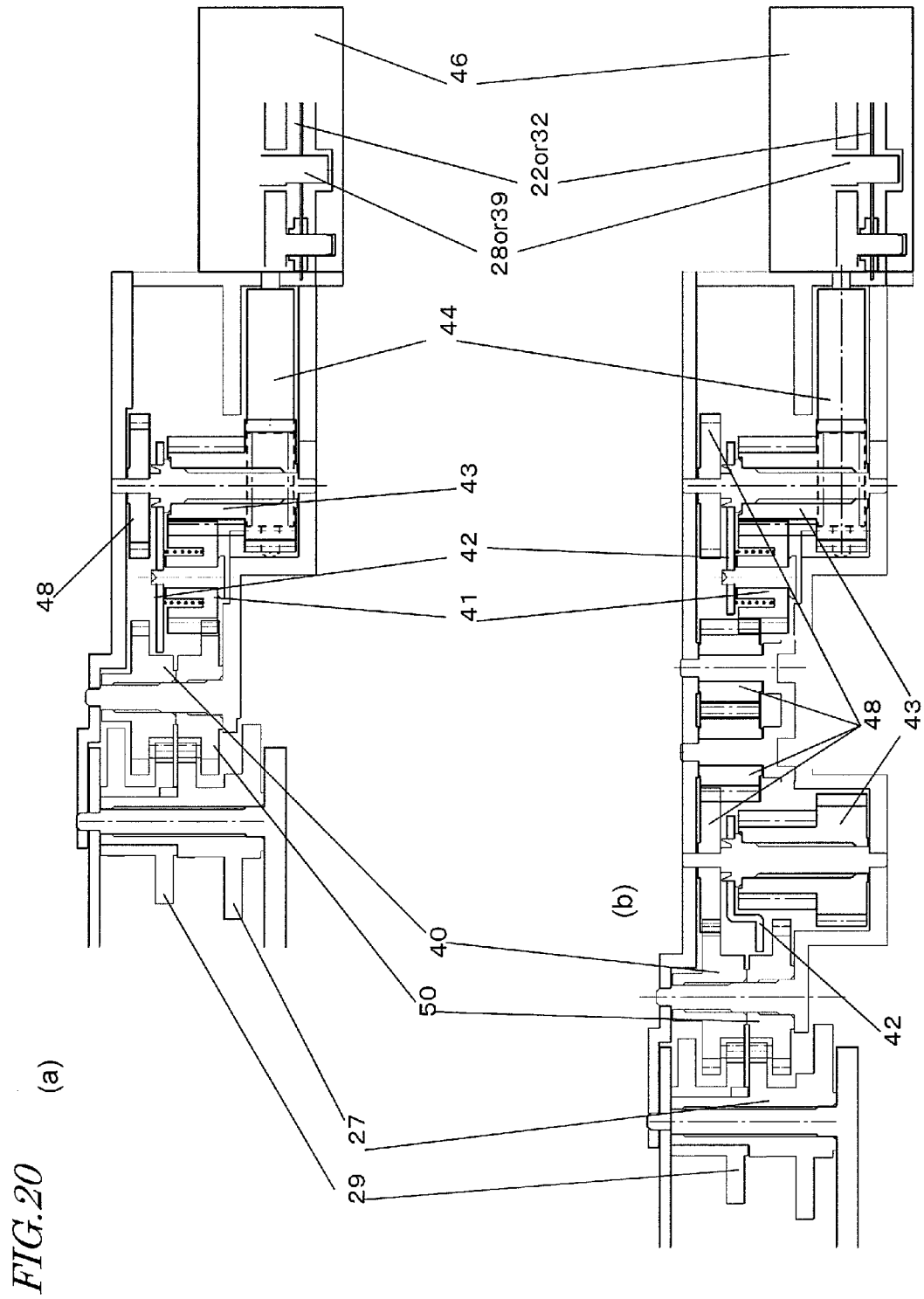

Portion (a) of FIG. 20 is a partial cross-sectional view of the focal plane shuttering apparatus 190 in the normally opened state, and portion (b) of FIG. 20 is a partial cross-sectional view of the focal plane shuttering apparatus 190 in the normally closed state.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventor provides the accompanying drawings and the following description to help those skilled in the art understand the present disclosure fully. And it is not intended that the subject matter defined by the appended claims is limited by those drawings or the description.

First of all, terms will be defined. In this description, the shutter of a shuttering apparatus provided for a camera body is supposed to be in either a "normally closed state" or a "normally opened state". For example, in a single-lens reflex camera including a mirror and an optical viewfinder (which will be sometimes abbreviated herein as "OVF"), when the user is monitoring the subject through the OVF, the aperture of its shutter is closed. Such a state of the shutter will be referred to herein as the "normally closed state". In the single-lens reflex camera described above, the state of its shutter immediately after the camera has been turned ON is also the normally closed state. On the other hand, in a mirrorless camera without a mirror, when the user is monitoring the subject through an electronic viewfinder (which will be sometimes abbreviated herein as "EVF") or on an LCD monitor, the shutter is opened. Such a state of the shutter will be referred to herein as the "normally opened state". In the mirrorless camera described above, the state of its shutter immediately after the camera has been turned ON is also the normally opened state.

According to conventional technologies, to change the states from the normally opened state into the normally closed state, for example, a shutter which has been locked by a front curtain locking member needs to be unlocked and closed. This "front curtain locking member" is a member for keeping the front curtain in the running finished state once the normally opened mechanism shutter has been charged. To use the shutter in the normally closed state, the front curtain locking member that has been locked needs to be unlocked by driving the front curtain locking member with a dedicated actuator (such as a plunger), for example. In this description, "to charge" means locking a target member (such as a front curtain or a rear curtain) at a predetermined position by rotating or moving the target member in such a direction as to increase the biasing force applied from a spring, for example.

The present inventor invented a focal plane shuttering apparatus which can change the states between the normally closed state and the normally opened state just by changing the driving direction of a charging actuator (charging motor) instead of adopting such a configuration.

Hereinafter, embodiments of a focal plane shuttering apparatus and image capture device according to the present disclosure will be described with reference to the accompanying drawings. It should be noted that the embodiments to be described below are just examples of the present disclosure and the present disclosure is in no way limited to those embodiments.

(1: Digital Camera)

A digital camera 1 in which a focal plane shuttering apparatus 190 according to the present disclosure is built will be outlined with reference to the accompanying drawings. It should be noted that the focal plane shuttering apparatus does not have to be built in the digital camera of this embodiment but may also be used in any other camera as well.

Figure 1:
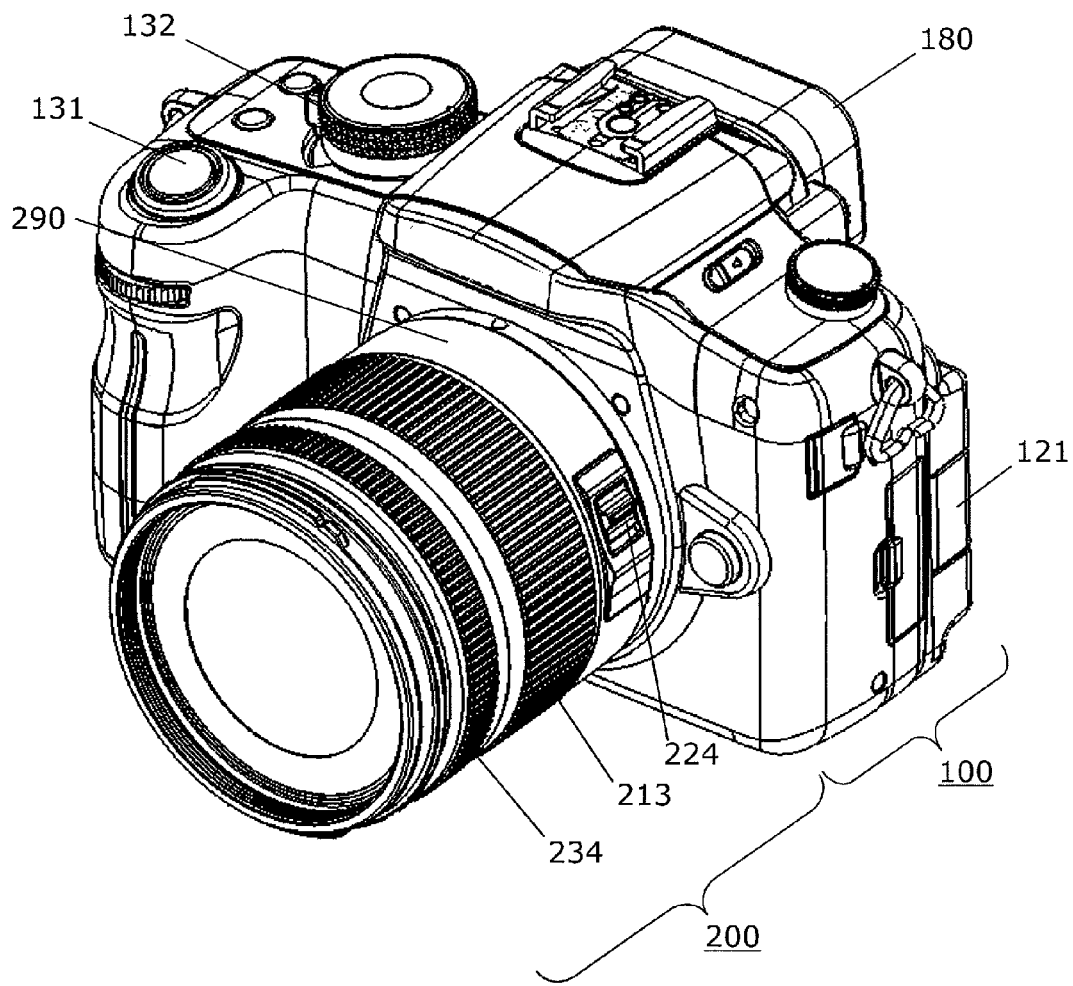
FIG. 1 is a perspective view illustrating a digital camera 1.
Figure 2:
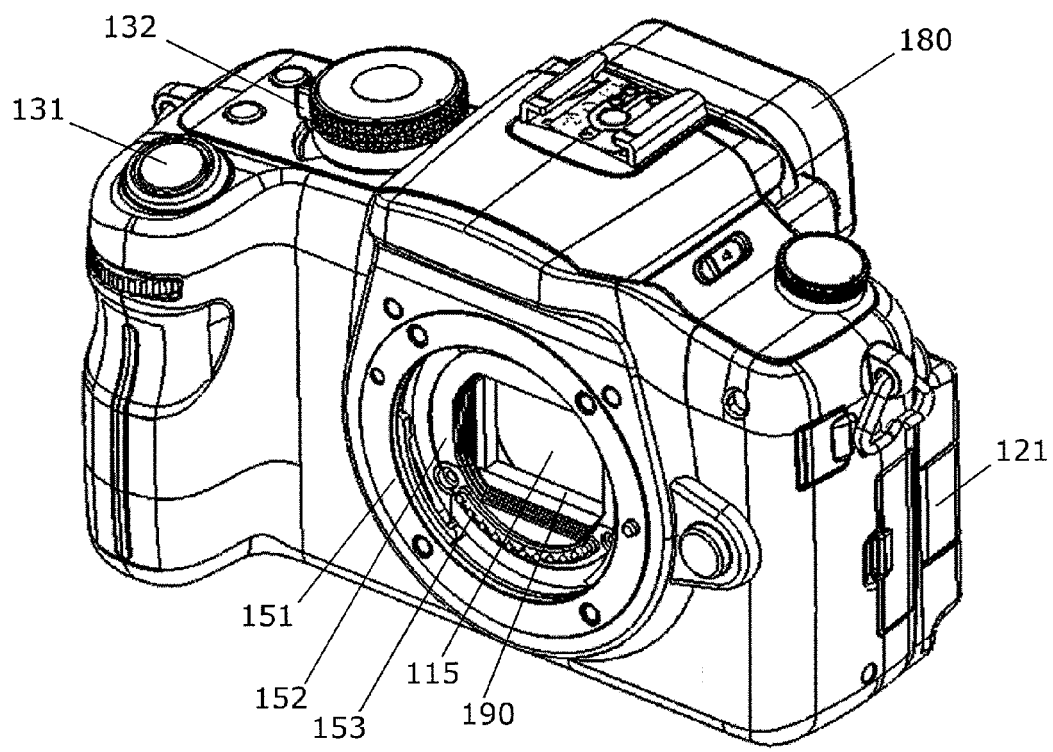
FIG. 2 is a perspective view illustrating its camera body 100.
Figure 3:
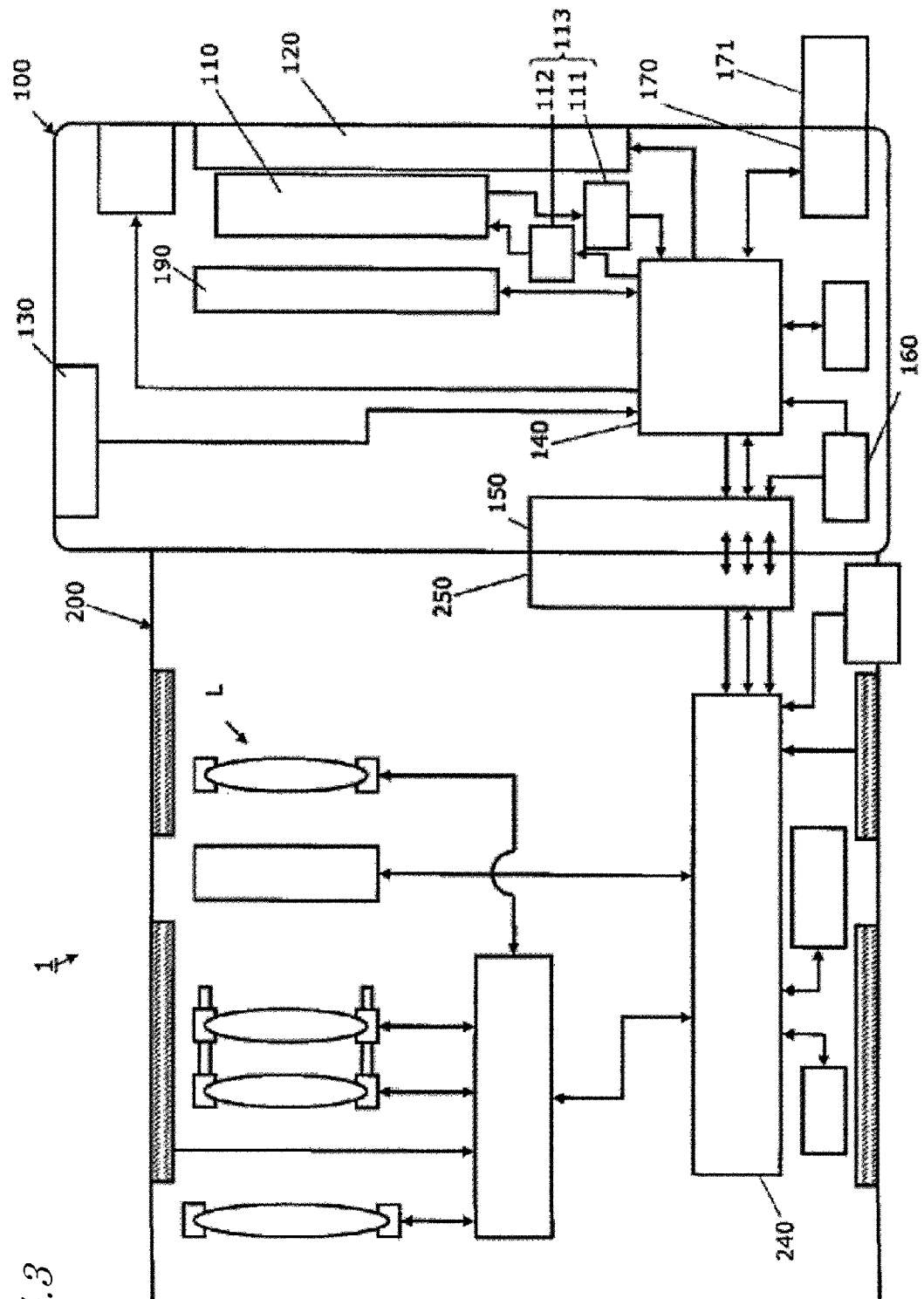
FIG. 3 is a block diagram of the digital camera 1.
Figure 4:
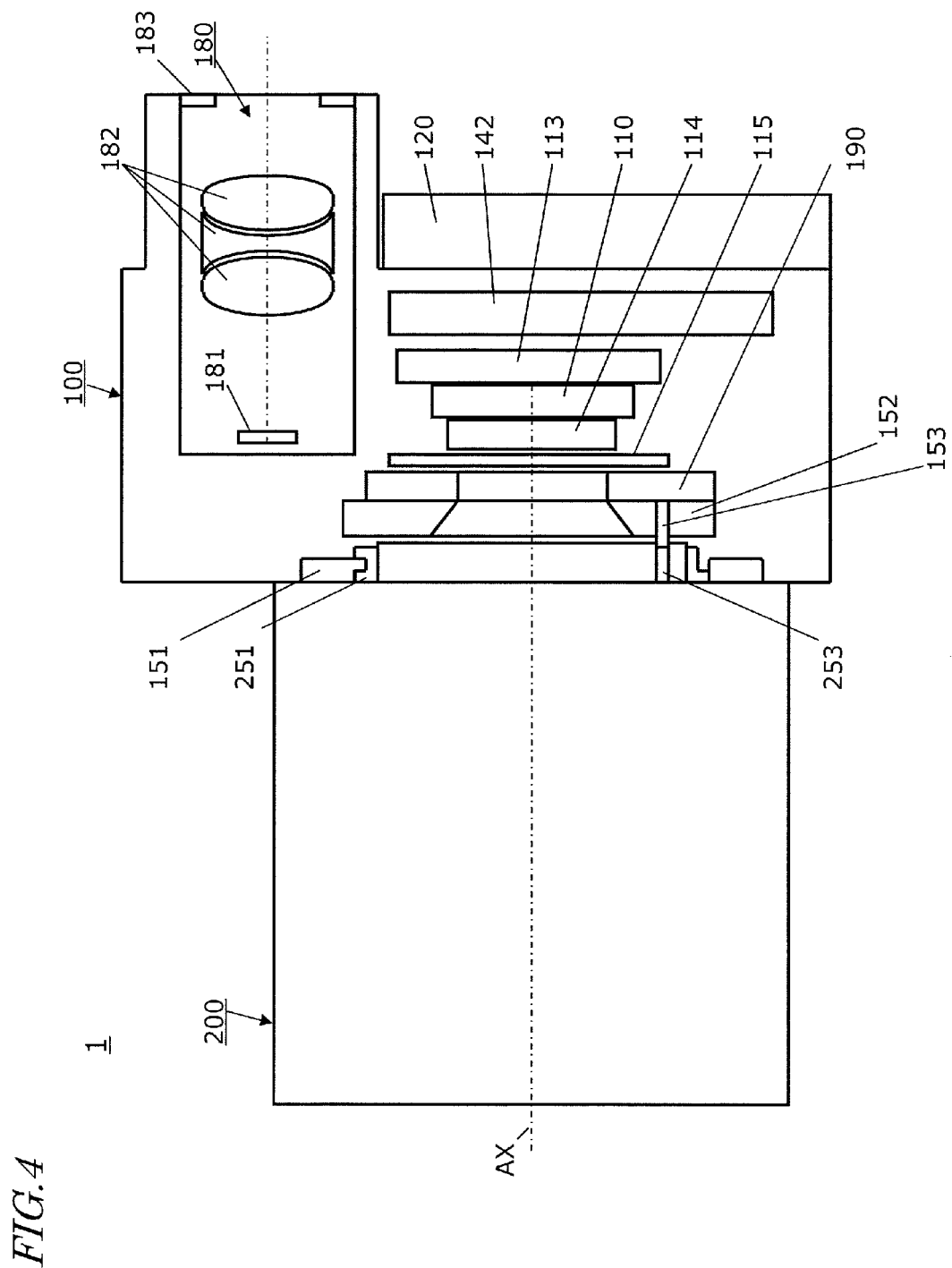
FIG. 4 is a general cross-sectional view of the digital camera 1.
Figure 5:
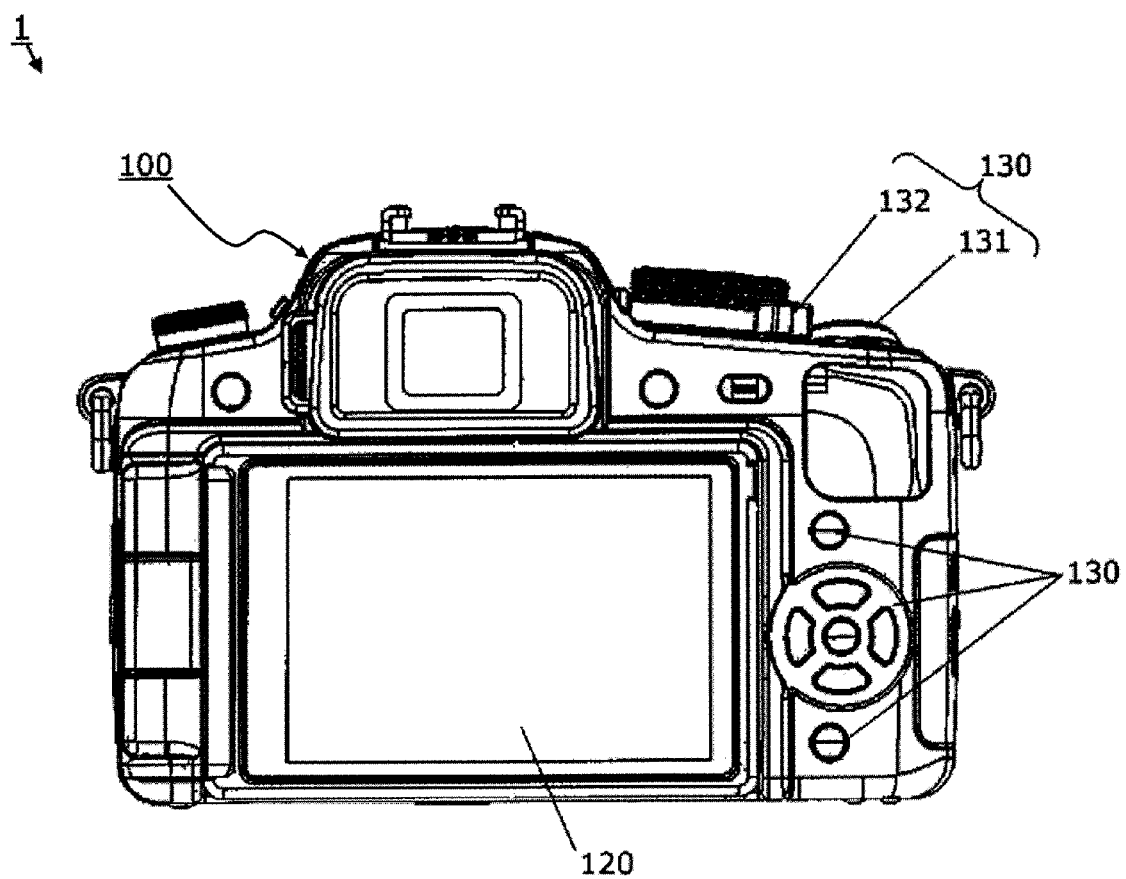
FIG. 5 is a rear view of the camera body 100.

First of all, look at FIGS. 1 to 5. FIG. 1 is a perspective view of a digital camera 1 as a first embodiment. FIG. 2 is a perspective view illustrating its camera body 100. FIG. 3 is a functional block diagram of the digital camera 1. FIG. 4 is a cross-sectional view generally illustrating the hardware of the digital camera 1. And FIG. 5 is a rear view of the camera body.

As shown in FIG. 1, the digital camera 1 is of an interchangeable lens type, and includes a camera body 100 and a lens unit 200 which is readily attachable and removable to/from the camera body 100. Also, as shown in FIGS. 2 to 4, the digital camera 1 includes a focal plane shuttering apparatus 190.

The camera body 100 can shoot a subject continuously. More specifically, the camera body 100 can change its modes of operation from an AF continuous shooting mode with a contrast AF (autofocus) enabled using an internal CMOS (complementary metal oxide semiconductor) image sensor 110 (to be described later) into a continuous shooting mode to be performed at higher speeds than in the AF continuous shooting mode (which will be referred to herein as a "high-speed continuous shooting mode"), and vice versa.

In the AF continuous shooting mode, the focal plane shuttering apparatus 190 performs a normally opened control. On the other hand, in the high-speed continuous shooting mode, the focal plane shuttering apparatus 190 performs a normally closed control.

In performing the normally opened control, it takes a longer time for the focal plane shutter to get a shooting-related preparation done than in performing the normally closed control. The reason is that the normally opened control should always go through a so-called "opened state" in which the front and rear curtains are kept in a running state and in a charged state, respectively. For that reason, in this embodiment, the normally opened control is supposed to be performed in the AF continuous shooting mode and the normally closed state is supposed to be performed in the high-speed continuous shooting mode as described above.

As shown in FIGS. 3 and/or 4, the camera body 100 has a CMOS image sensor 110, a CMOS circuit board 113, a camera monitor 120, an operating section 130, a main circuit board 142 including a camera controller 140, a body mount 150, a power supply 160, a card slot 170, and a focal plane shuttering apparatus 190.

The CMOS image sensor 110 is an exemplary image sensor to transform an optical image of the subject into an electrical image signal. The image sensor does not have to be the CMOS image sensor 110 but may also be any other photoelectric transducer such as a CCD image sensor.

The CMOS image sensor 110 transforms an optical image of the subject (which will be sometimes referred to herein as a "subject image") that has come through the lens unit 200 into an image signal. The image signal thus generated is converted into a digital signal by the A/D converter 111 (see FIG. 3) of the CMOS circuit board 113 to be described later and output as image data. The camera controller 140 subjects the image data that has been digitized by the A/D converter 111 to various kinds of image processing, examples of which include gamma correction, white balance correction, flaw correction, YC conversion, electronic zooming, and JPEG compression.

The CMOS image sensor 110 operates in response to a timing signal that has been generated by a timing generator 112. Under the control of the CMOS circuit board 113, the CMOS image sensor 110 can obtain still picture data and movie data. The movie data thus obtained may also be used to display a through-the-lens image. It should be noted that the still picture data and the movie data are examples of image data.

In this description, the "through-the-lens image" is an image that forms part of the movie data and that is not written on the memory card 171. The through-the-lens image is usually a movie and is displayed on the camera monitor 120 to help the user determine the composition of a movie or a still picture.

The CMOS image sensor 110 can generate a low-resolution movie signal to be used as a through-the-lens image and a high-resolution movie signal to be written. The high-resolution movie may be a movie with an HD resolution (each frame of which may have a resolution of 1920×1080 pixels, for example).

The CMOS image sensor 110 has an electronic front curtain function for sequentially resetting pixels in the running direction of a group of front curtains 21 to be described later.

The CMOS circuit board 113 includes a circuit for controlling the CMOS image sensor 110. Specifically, the CMOS circuit board 113 includes an A/D converter 111 and the timing generator 112.

As described above, the A/D converter 111 of the CMOS circuit board 113 digitizes the image signal supplied from the CMOS image sensor 110, thereby generating image data. The CMOS circuit board 113 is an exemplary image sensor circuit board which drives and controls the image sensor and which subjects the image data supplied from the image sensor to A/D conversion and other kinds of predetermined processing.

The camera monitor 120 displays an image represented by image data to be displayed and other images. The camera monitor 120 may be a liquid crystal display, for example. The image data to be displayed is generated by the camera controller 140, and is data to display, as an image, various kinds of information including image data that has been subjected to image processing, a shooting condition on the digital camera 1, and an operating menu. The camera monitor 120 can display both movies and still pictures selectively.

The camera monitor 120 is provided for the camera body 100. Although the camera monitor 120 is arranged in this embodiment on the back of the camera body 100, the camera monitor 120 may be arranged anywhere else on the camera body 100. For example, the camera monitor 120 may also be arranged on a side surface or on the upper surface of the camera body 100.

It should be noted that the camera monitor 120 is an exemplary display section provided for the camera body 100. Any other device may be used as the display section as long as the device can display an image. For example, not just a liquid crystal display but also an organic EL panel, an inorganic EL panel and a plasma display panel may be used as well.

The operating section 130 is an interface which accepts user's instructions. Specifically, the operating section 130 includes a release button 131 and a power switch 132 as shown in FIG. 5. The release button 131 accepts a focal plane shuttering instruction by the user. The power switch 132 is a rotary dial switch arranged on the upper surface of the camera body 100, and is used to turn ON or OFF the camera body 100. Anything may be used as the operating section 130 as long as it can accept the user's instructions. Examples of the operating section 130 include a button, a lever, a dial and a touchscreen panel.

Now look at FIG. 3 again.

The camera controller 140 controls the overall operation of this digital camera 1, i.e., the operations of the respective components of the digital camera 1. For example, the camera controller 140 accepts an instruction that has been entered through the operating section 130. Also, the camera controller 140 transmits a signal to control the lens unit 200 to the lens controller 240 via the body mount 150 and a lens mount 250, thereby controlling the respective sections of the lens unit 200 indirectly.

Furthermore, the camera controller 140 also controls the CMOS circuit board 113. Specifically, the camera controller 140 sends a control signal to the CMOS circuit board 113, which in turn controls the CMOS image sensor 110 in accordance with the control signal received. That is to say, it can be said that the camera controller 140 controls the operation of the CMOS image sensor 110 by controlling the CMOS circuit board 113. Also, the camera controller 140 obtains image data that has been subjected to A/D conversion and other predetermined kinds of processing by the CMOS circuit board 113 and subjects the image data to further processing. For example, based on the image data that has been processed by the CMOS circuit board 113, the camera controller 140 generates the image data to be displayed and movie data to be written.

The memory card 171 is readily attachable to, and removable from, the card slot 170. The card slot 170 controls the memory card 171 in accordance with a control signal supplied from the camera controller 140. Specifically, the card slot 170 stores image data on the memory card 171 and retrieves the image data from the memory card 171.

The memory card 171 can store the image data that has been generated by the camera controller 140 through image processing. For example, the memory card 171 can store non-compressed RAW image files and compressed JPEG image files. Furthermore, the memory card 171 can further output an image file that has been stored inside itself in advance through the card slot 170. The camera controller 140 subjects images which are included in the image file that has been provided by the memory card 171 to predetermined processing. For instance, the camera controller 140 subjects the image file that has been gotten from the memory card 171 to expansion processing, thereby generating image data to be displayed.

The memory card 171 can further store movie data that has been generated by the camera controller 140 through image processing. For example, the memory card 171 can store a movie file which has been compressed in compliance with the H.264/AVC, which is a moving picture compression standard. Also, the memory card 171 can output a movie file which has been stored inside itself in advance through the card slot 170. The camera controller 140 subjects the image included in a movie file that has been supplied from the memory card 171 to a predetermined kind of processing. For example, the camera controller 140 subjects the movie file that has been retrieved from the memory card 171 to expansion processing, thereby generating movie data to be displayed.

It should be noted that the memory card 171 forms part of a storage section, which may be attachable to, and removable from, the camera body 100 such as the memory card 171 or may be fixed to (or built in) the digital camera 1.

The power supply 160 supplies power to be used by the digital camera 1 to respective parts. The power supply 160 may be a dry battery or a rechargeable battery. Alternatively, the power supply 160 may also be a unit which is supplied with power from an external power supply through a power code and which relays the power to the digital camera 1.

When the lens unit 200 is attached to the camera body 100, the body mount 150 gets engaged with the lens mount 250 and supports the lens unit 200. Also, the body mount 150 and the lens mount 250 are electrically connected together. The camera body 100 can transmit and receive data and/or control signals to/from the lens unit 200 via the body mount 150 and the lens mount 250.

The focal plane shuttering apparatus 190 is arranged in front of the CMOS image sensor 110 (i.e., closer to the lens unit 200 than the CMOS image sensor 110 is). The focal plane shuttering apparatus 190 can change its states from a state in which light traveling from the optical system L to the CMOS image sensor 110 is cut into a state in which the light traveling from the optical system L to the CMOS image sensor 110 is passed, and vice versa. By adjusting the period of time for which the shutter is opened, the focal plane shuttering apparatus 190 controls the exposure time of the CMOS image sensor 110.

The lens unit 200 is attachable to, and removable from, the camera body 100 and produces an optical image of the subject. More specifically, the lens unit 200 includes the optical system L, a driver 215, the lens mount 250, the lens controller 240 and a lens barrel 290.

The optical system L produces an optical image of the subject on the photosensitive plane of the CMOS image sensor 110.

The lens controller 240 controls the entire lens unit 200 in accordance with a control signal supplied from the camera controller 140.

(2: Configuration for Focal Plane Shuttering Apparatus 190)

Hereinafter, a focal plane shuttering apparatus 190 according to this first embodiment of the present disclosure will be described with reference to FIGS. 6 through 11.

Aperture Opening and Closing Mechanism

Figure 6:
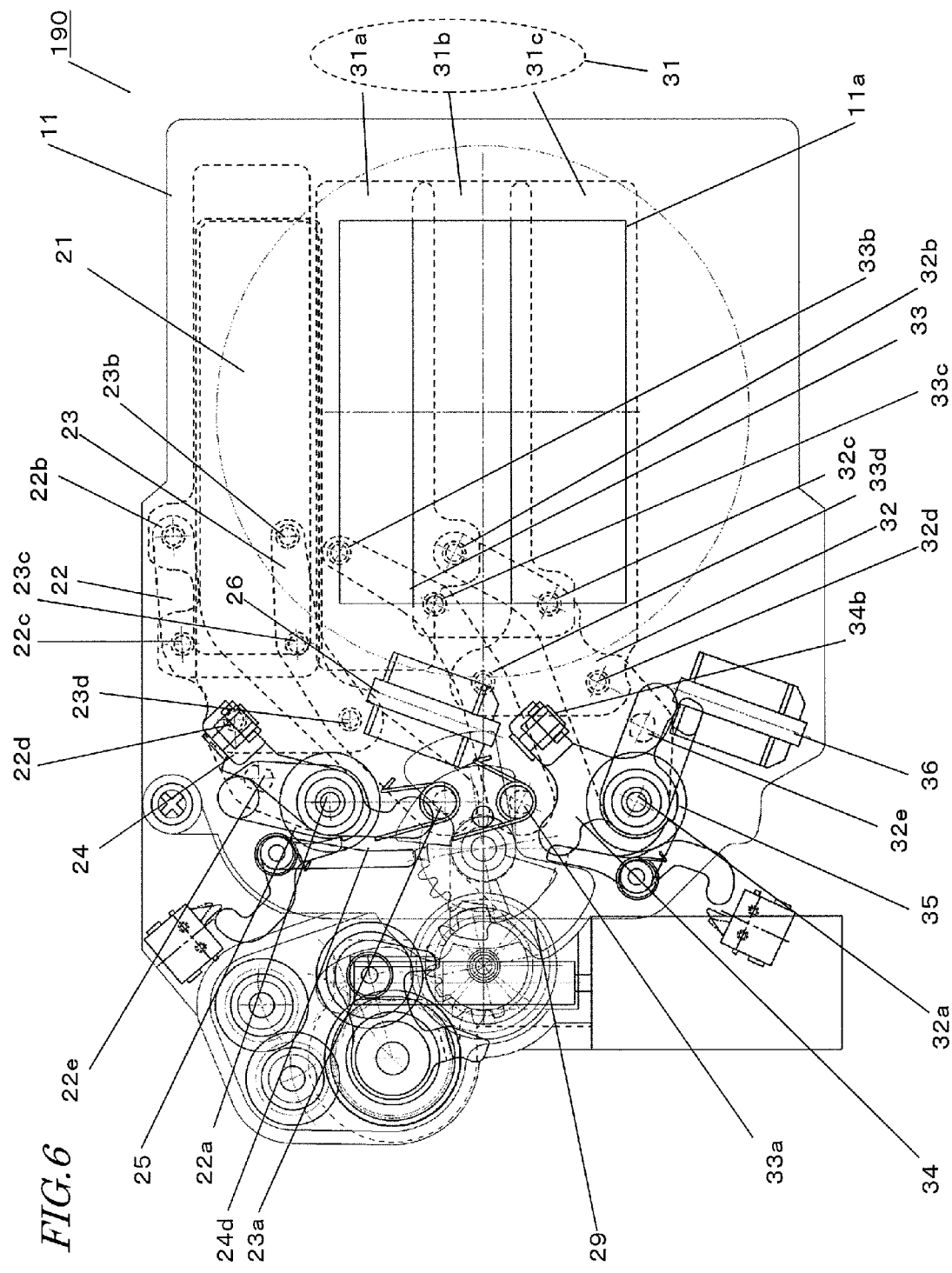
FIG. 6 illustrates how a focal plane shuttering apparatus 190 in a normally opened state looks when its rear curtain finishes running.
Figure 7:
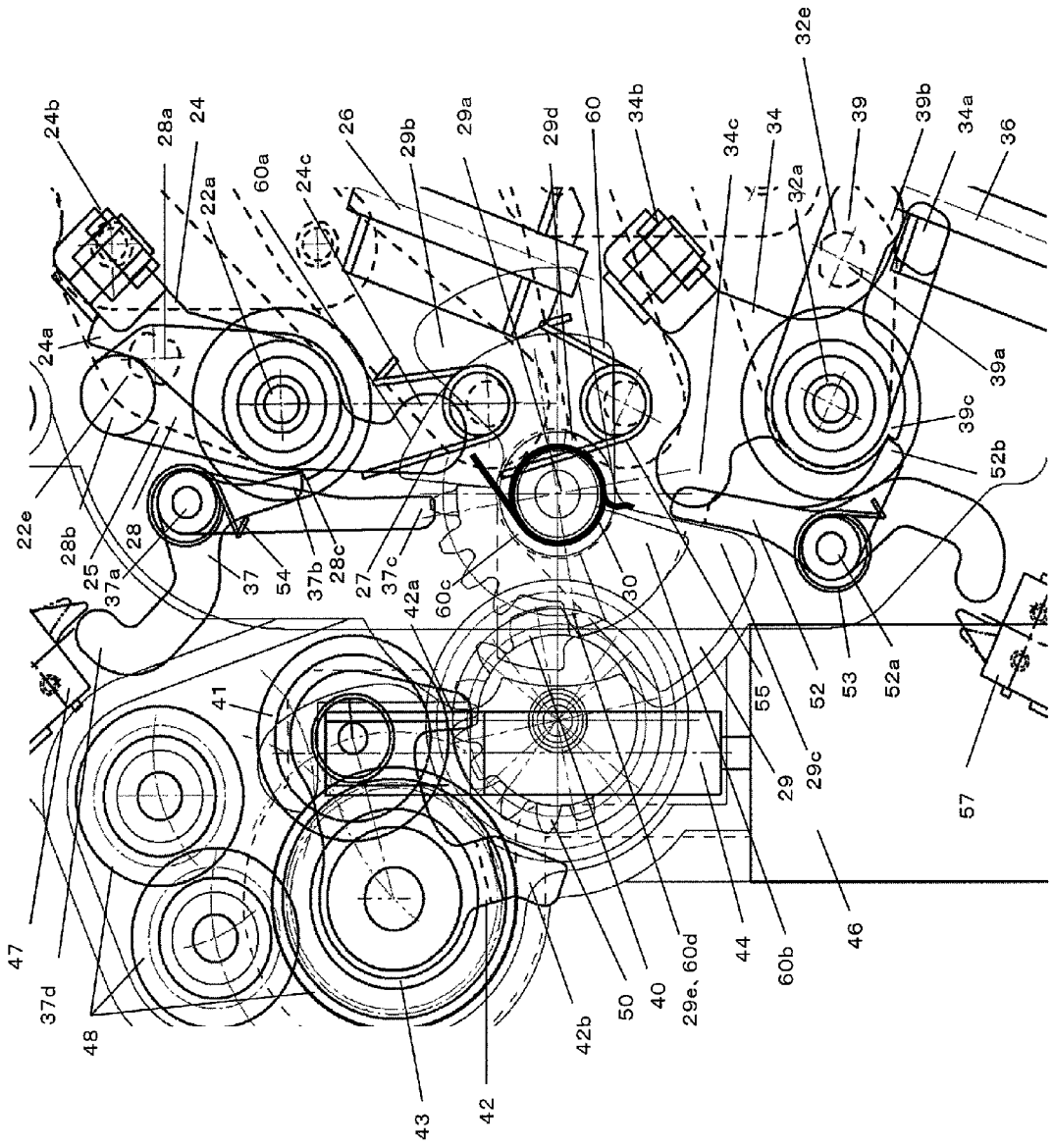
FIG. 7 illustrates in further detail a principal portion of the apparatus shown in FIG. 6.

FIG. 6 illustrates a shooting finished state of the focal plane shuttering apparatus (i.e., a state in which the rear curtain has finished running). FIG. 7 illustrates a principal part of FIG. 6 on a larger scale.

The shutter base plate 11 has a structure in which two plates are laid one upon the other. Those two plates are arranged so that a gap that is wide enough to allow a group of front curtains 21 and a group of rear curtains 31 to run through the gap is left between them. The shutter base plate 11 has a window (which will be referred to herein as an "aperture") 11a to lead the light that has come from the subject via the shooting lens L to the CMOS image sensor 110.

Figure 10:
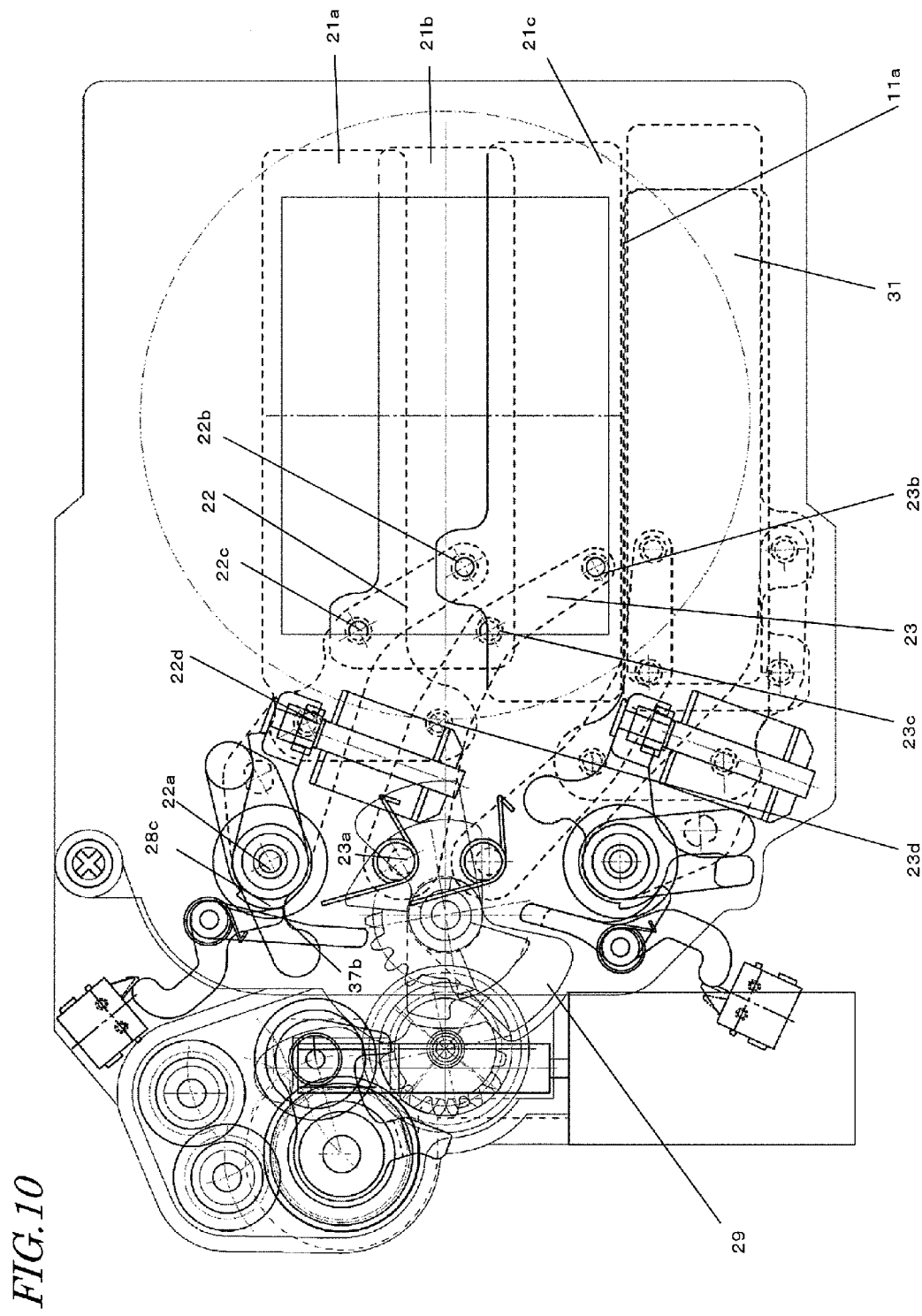
FIG. 10 illustrates how the focal plane shuttering apparatus 190 in the normally opened state looks in a slit exposure shooting standby mode.

In this embodiment, the group of front curtains 21 consists of three blades. Those three blades which form the group of front curtains 21 are illustrated in FIG. 10 as first, second and third front curtains 21a, 21b and 21c. In FIG. 6, those three blades that form the group of front curtains 21 are indicated by the dotted rectangles.

The group of front curtains 21 is driven as a front curtain driving arm 22 and a front curtain following arm 23 rotate. The front curtain driving arm 22 has shafts 22b, 22c and 22d. The first, second and third front curtains 21a, 21b and 21c are loaded rotatably on the shafts 22d, 22c and 22b, respectively. On the other hand, the front curtain following arm 23 has shafts 23b, 23c and 23d. The first, second and third front curtains 21a, 21b and 21c are loaded rotatably on the shafts 23d, 23c and 23b, respectively.

The front curtain driving arm 22 is supported rotatably on a front curtain driving arm shaft 22a with respect to the shutter base plate 11. Meanwhile, the front curtain following arm 23 is supported rotatably on a front curtain following arm shaft 23a with respect to the shutter base plate 11. In this manner, the group of front curtains 21 forms a so-called "parallel link mechanism". As the front curtain driving and following arms 22 and 23 rotate, the first, second and third front curtains 21a, 21b and 21c sequentially move along the shorter sides of the aperture 11a while being kept parallel to the longer sides of the aperture 11a. And the group of front curtains 21 may be sometimes retracted from the aperture 11a as shown in FIG. 6 (such a state will be referred to herein as a "front curtain running finished state") and may sometimes cover the aperture 11a as shown in FIG. 10 (such a state will be referred to herein as a "front curtain shooting standby state"). The group of front curtains 21 can make a transition from one of these two states into the other by getting the first, second and third blades 21a, 21b and 21c driven.

The group of rear curtains 31 also consists of three blades. Those three blades which form the group of rear curtains 31 are illustrated in FIG. 6 as first, second and third rear curtains 31a, 31b and 31c.

The group of rear curtains 31 is driven as a rear curtain driving arm 32 and a rear curtain following arm 33 rotate. The rear curtain driving arm 32 has shafts 32b, 32c and 32d. The first, second and third rear curtains 31a, 31b and 31c are loaded rotatably on the shafts 32b, 32c and 32d, respectively. On the other hand, the rear curtain following arm 33 has shafts 33b, 33c and 33d. The first, second and third rear curtains 31a, 31b and 31c are loaded rotatably on the shafts 33b, 33c and 33d, respectively.

The rear curtain driving arm 32 is supported rotatably on a rear curtain driving arm shaft 32a with respect to the shutter base plate 11. Meanwhile, the rear curtain following arm 33 is supported rotatably on a rear curtain following arm shaft 33a with respect to the shutter base plate 11. In this manner, the group of rear curtains 31 forms a so-called "parallel link mechanism". As the rear curtain driving and following arms 32 and 33 rotate, the first, second and third rear curtains 31a, 31b and 31c sequentially move along the shorter sides of the aperture 11a while being kept parallel to the longer sides of the aperture 11a. And the group of rear curtains 31 may sometimes cover the aperture 11a as shown in FIG. 6 (such a state will be referred to herein as a "rear curtain running finished state") and may sometimes be retracted from the aperture 11a as shown in FIG. 10 (such a state will be referred to herein as a "rear curtain shooting standby state"). The group of rear curtains 31 can make a transition from one of these two states into the other by getting the first, second and third blades 31a, 31b and 31c driven.

Front Curtain Driving Mechanism

Next, a front curtain driving mechanism for driving the group of front curtains 21 will be described with reference to FIGS. 6 and 7.

The front curtain driving arm 22 (see FIG. 6) has a front curtain driving arm coupling hole 22e, to which a front curtain driving lever coupling pin 28a (see FIG. 7) has been inserted. The front curtain driving lever coupling pin 28a is provided for a front curtain driving lever 28 (see FIG. 7). Just like the front curtain driving arm 22, the front curtain driving lever 28 is also supported rotatably on the shaft 22a (see FIG. 7). The front curtain driving arm and driving lever 22 and 28 both rotate on the shaft 22a while being linked together.

A front curtain setting spring 27 applies biasing force to the front curtain driving arm 22. The biasing force applied from the front curtain setting spring 27 is also transferred to the front curtain following arm 23 (see FIG. 6) and the front curtain driving lever 28. And the front curtain setting spring 27 applies the clockwise biasing force to the front curtain driving lever 28. Since the front curtain driving lever coupling pin 28a of the front curtain driving lever 28 has been inserted into the front curtain driving arm coupling hole 22e of the front curtain driving arm 22 (see FIG. 6), the clockwise biasing force is applied to the front curtain driving arm 22 (see FIG. 6), too. That is to say, the biasing force from the front curtain setting spring 27 is applied in the direction in which the group of front curtains 21 covers the aperture 11a.

The front curtain driving lever 28 has a front curtain driving lever locking portion 28c. As shown in FIG. 10, the front curtain driving lever locking portion 28c contacts with a locking claw 37b provided for a front curtain locking lever 37. The front curtain locking lever 37 is supported rotatably on a shaft 37a. The shaft 37a is fixed on the shutter base plate 11. Furthermore, biasing force is applied counterclockwise from a front curtain locking lever spring 54 to the front curtain locking lever 37.

The front curtain driving lever 28 has a front curtain driving lever contacting portion 28b, which contacts with a front curtain setting lever contacting portion 24a that is provided for a front curtain setting lever 24. Just like the front curtain driving lever 28, the front curtain setting lever 24 is supported rotatably on the shaft 22a. As the front curtain setting lever 24 rotates counterclockwise, the front curtain setting lever contacting portion 24a pushes the front curtain driving lever contacting portion 28b to turn the front curtain driving lever 28 counterclockwise. As biasing force is applied counterclockwise from the front curtain setting spring 27 to the front curtain driving lever 28, the front curtain setting lever contacting portion 24a contacts with the front curtain driving lever contacting portion 28b.

It is a front curtain traveling spring 25 (see FIG. 6) that applies the counterclockwise biasing force to the front curtain setting lever 24. That is to say, the front curtain traveling spring 25 applies strong counterclockwise biasing force to the front curtain setting lever 24. The biasing force applied from the front curtain traveling spring 25 is transferred to the front curtain driving lever 28 via the contact between the front curtain setting lever contacting portion 24a and the front curtain driving lever contacting portion 28b. In this manner, the front curtain traveling spring 25 applies such strong counterclockwise biasing force to the front curtain driving lever 28. And the biasing force applied from the front curtain traveling spring 25 is also transferred to the front curtain driving arm 22 and the group of front curtains 21. That is to say, the biasing force is applied from the front curtain traveling spring 25 in the direction in which the group of front curtains 21 retracts from the aperture 11a. In this case, the counterclockwise biasing force applied from the front curtain traveling spring 25 to the front curtain driving lever 28 is stronger than the clockwise biasing force applied from the front curtain setting spring 27 to the front curtain driving lever 28. Consequently, since the biasing force applied from the front curtain traveling spring 25 is stronger than the biasing force applied from the front curtain setting spring 27, the resultant force of the respective biasing forces applied from the front curtain traveling spring 25 and the front curtain setting spring 27 can make the group of front curtains 21 run in such a direction as to get the group of front curtains 21 retracted from the aperture 11a.

In addition, a front curtain guiding piece 24b is provided for the front curtain setting lever 24. The front curtain guiding piece 24b may be attracted to a front curtain electromagnet 26, which can attract the front curtain guiding piece 24b by generating magnetic attractive force that is strong enough to overcome the biasing force applied from the front curtain traveling spring 25. As a result, the running direction of the group of front curtains 21, i.e., the opening and closing operations by the group of front curtains 21, can be controlled.

Rear Curtain Driving Mechanism

Next, a rear curtain driving mechanism for driving the group of rear curtains 31 will be described with reference to FIGS. 6 and 7.

The rear curtain driving arm 32 (see FIG. 6) has a rear curtain driving arm coupling hole 32e (see FIG. 6), to which a rear curtain driving lever coupling pin 39a (see FIG. 7) has been inserted. The rear curtain driving lever coupling pin 39a is provided for a rear curtain driving lever 39 (see FIG. 7). Just like the rear curtain driving arm 32, the rear curtain driving lever 39 is also supported rotatably on the shaft 32a (see FIG. 7). The rear curtain driving arm and driving lever 32 and 39 both rotate on the shaft 32a while being linked together.

A rear curtain setting spring 55 applies biasing force to the rear curtain driving arm 32. The biasing force applied from the rear curtain setting spring 55 is also transferred to the rear curtain following arm 33 (see FIG. 6) and the rear curtain driving lever 39. And the rear curtain setting spring 55 applies a clockwise biasing force to the rear curtain driving lever 39. Since the rear curtain driving lever coupling pin 39a of the rear curtain driving lever 39 has been inserted into the rear curtain driving arm coupling hole 32e of the rear curtain driving arm 32 (see FIG. 6), a clockwise biasing force is applied to the rear curtain driving arm 32 (see FIG. 6), too. That is to say, the biasing force from the rear curtain setting spring 55 is applied in the direction in which the group of rear curtains 31 covers the aperture 11a.

The rear curtain driving lever 39 has a rear curtain driving lever locking portion 39c. The rear curtain driving lever locking portion 39c can get engaged with a locking portion 52b of the rear curtain locking lever 52 with the group of rear curtains 31 covering the aperture 11a. The rear curtain locking lever 52 is supported rotatably on a shaft 52a. The shaft 52a is fixed on the shutter base plate 11. Furthermore, a counterclockwise biasing force is applied from a rear curtain locking lever spring 53 to the rear curtain locking lever 52.

The rear curtain driving lever 39 has a rear curtain driving lever contacting portion 39b, which contacts with a rear curtain setting lever contacting portion 34a that is provided for a rear curtain setting lever 34. Just like the rear curtain driving lever 39, the rear curtain setting lever 34 is supported rotatably on the shaft 32a. As the rear curtain setting lever 34 rotates counterclockwise, the rear curtain setting lever contacting portion 34a pushes the rear curtain driving lever contacting portion 39b to turn the rear curtain driving lever 39 counterclockwise. As biasing force is applied counterclockwise from the rear curtain setting spring 55 to the rear curtain driving lever 39, the rear curtain setting lever contacting portion 34a contacts with the rear curtain driving lever contacting portion 39b.

It is a rear curtain traveling spring 35 (see FIG. 6) that applies the counterclockwise biasing force to the rear curtain setting lever 34. That is to say, the rear curtain traveling spring 35 applies strong counterclockwise biasing force to the rear curtain setting lever 34. The biasing force applied from the rear curtain traveling spring 35 is transferred to the rear curtain driving lever 39 via the contact between the rear curtain setting lever contacting portion 34a and the rear curtain driving lever contacting portion 39b. In this manner, the rear curtain traveling spring 35 applies such strong counterclockwise biasing force to the rear curtain driving lever 39. And the biasing force applied from the rear curtain traveling spring 35 is also transferred to the rear curtain driving arm 32 and the group of rear curtains 31. That is to say, the biasing force is applied from the rear curtain traveling spring 35 in the direction in which the group of rear curtains 31 covers the aperture 11a. In this case, the counterclockwise biasing force applied from the rear curtain traveling spring 35 to the rear curtain driving lever 39 is stronger than the clockwise biasing force applied from the rear curtain setting spring 55 to the rear curtain driving lever 39. Consequently, since the biasing force applied from the rear curtain traveling spring 35 is stronger than the biasing force applied from the rear curtain setting spring 55, the resultant force of the respective biasing forces applied from the rear curtain traveling spring and setting spring 35 and 55 can make the group of rear curtains 31 run in such a direction in which the rear curtains 31 cover the aperture 11a.

In addition, a rear curtain guiding piece 34b is provided for the rear curtain setting lever 34. The rear curtain guiding piece 34b may be attracted to a rear curtain electromagnet 36, which can attract the rear curtain guiding piece 34b by generating magnetic attractive force that is strong enough to overcome the biasing force applied from the rear curtain traveling spring 35. As a result, the running direction of the group of rear curtains 31, i.e., the opening and closing operations by the group of rear curtains 31, can be controlled.

Normally Opened Charging Mechanism

Next, a normally opened charging mechanism will be described.

The focal plane shuttering apparatus 190 includes a front curtain setting lever 24, a front curtain driving lever 28, a charging lever 29, a rear curtain setting lever 34, a front curtain locking lever 37, a rear curtain driving lever 39, a normally opened charging missing tooth gear 40, a planetary gear 41, a planetary carrier 42, a sun gear 43, a worm gear 44, a charging motor 46, a coupled gear 48, a normally closed charging missing tooth gear 50, a rear curtain locking lever 52 and a unlocking lever 60. A front curtain charging input portion 24c is arranged at one end of the front curtain setting lever 24. And a rear curtain charging input portion 34c is arranged at one end of the rear curtain setting lever 34.

The charging lever 29 includes a front curtain setting cam 29b and a rear curtain setting cam 29c. The front curtain setting cam 29b turns the front curtain setting lever 24 clockwise, thereby bringing the front curtain guiding piece 24b into contact with the front curtain electromagnet 26. Likewise, the rear curtain setting cam 29c turns the rear curtain setting lever 34 clockwise, thereby bringing the rear curtain guiding piece 34b into contact with the rear curtain electromagnet 36. That is to say, the charging lever 29 performs a charging operation by using the respective biasing forces applied from the front curtain setting and traveling springs 27 and 25 and the rear curtain setting and traveling springs 55 and 35. In this description, a state in which the front curtain electromagnet 26 is ready to attract the front curtain guiding piece 24b will be referred to herein as a "front curtain charging finished state", and a state in which the rear curtain electromagnet 36 is ready to attract the rear curtain guiding piece 34b will be referred to herein as a "rear curtain charging finished state". Also, to turn the front curtain into the charging finished state will be referred to herein as "charging the front curtain", and to turn the rear curtain into the charging finished state will be referred to herein as "charging the rear curtain".

A charging lever missing tooth gear 29e is supported along with the charging lever 29. Specifically, the charging lever 29 and the charging lever missing tooth gear 29e are supported rotatably on a charging lever shaft 29a. A charging lever returning spring 30 applies clockwise biasing force to the charging lever 29. The charging lever returning spring 30 may be a helical torsion coil spring, for example, and is arranged on the shaft of the charging lever 29.

A stopper (not shown) is provided for the shutter base plate 11. When contacting with the stopper of the charging lever 29, the stopper prevents the charging lever 29 from rotating under the biasing force applied from the charging lever returning spring 30. In a situation where no force other than the biasing force applied from the charging lever returning spring 30 is acting on the charging lever 29, the charging lever 29 is held at a position where the charging lever 29 contacts with the stopper (not shown) of the shutter base plate 11.

The charging lever missing tooth gear portion 29e is engageable with a missing tooth gear 40, which is supported rotatably on the shutter base plate 11. The missing tooth gear 40 is comprised of stacked gears and has a gear portion, which has teeth over the entire periphery thereof and which is engageable with the planetary gear 41.

The planetary gear 41 is supported rotatably on the planetary carrier 42, which has the same shaft as the sun gear 43 and which is supported rotatably on the shutter base plate 11. The sun gear 43 and the planetary gear 41 are engaged with each other. In this case, if a moderate rotational load is imposed on any of the planetary carrier 42, the planetary gear 41 and the sun gear 43, the planetary carrier 42 and the planetary gear 41 rotate according to the rotation direction of the sun gear 43.

The planetary carrier 42 includes first and second rotation preventing portions 42a and 42b, which contact with first and second stoppers (not shown), respectively, on the shutter base plate 11. As a result, the planetary carrier 42 is prevented from rotating.

The sun gear 43 is comprised of stacked gears and has a worm wheel that engages with the worm gear 44, which is arranged on the shaft of the motor 46.

A front curtain unlocking sensing switch 47 is fixed on the shutter base plate 11 and detects the position of the front curtain locking lever 37 rotating.

A rear curtain unlocking sensing switch 57 is fixed on the shutter base plate 11 and detects the position of the rear curtain locking lever 52 rotating.

Running Finished State

As shown in FIG. 6, the group of front curtains 21 has gotten retracted to over the aperture 11a under the biasing force applied from the front curtain traveling spring 25. On the other hand, as shown in FIG. 7, the front curtain setting lever and driving lever 24 and 28 have their contacting portions 24a and 28b kept in contact with each other under the biasing forces applied from the front curtain setting spring and traveling spring 27 and 25, and both keep having rotated counterclockwise. Meanwhile, the group of rear curtains 31 covers the aperture 11a under the biasing force applied from the rear curtain traveling spring 35. On the other hand, the rear curtain setting lever and driving lever 34 and 39 have their contacting portions 34a and 39b kept in contact with each other under the biasing force applied from the rear curtain traveling spring 35, and both keep having rotated counterclockwise.

Charging Operation

Figure 8:
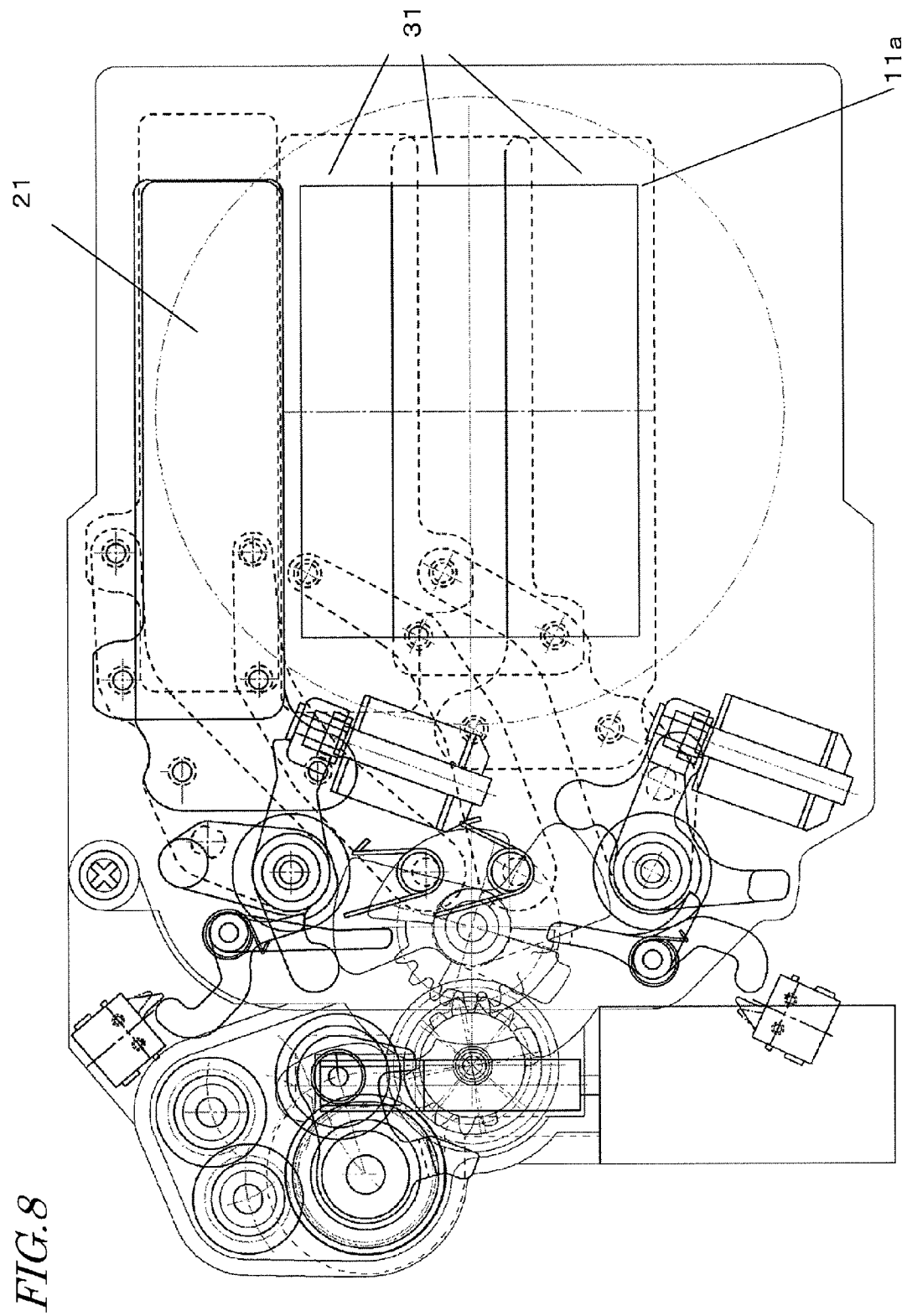
FIG. 8 illustrates how the focal plane shuttering apparatus 190 in the normally opened state looks when a charging operation is done.
Figure 14:
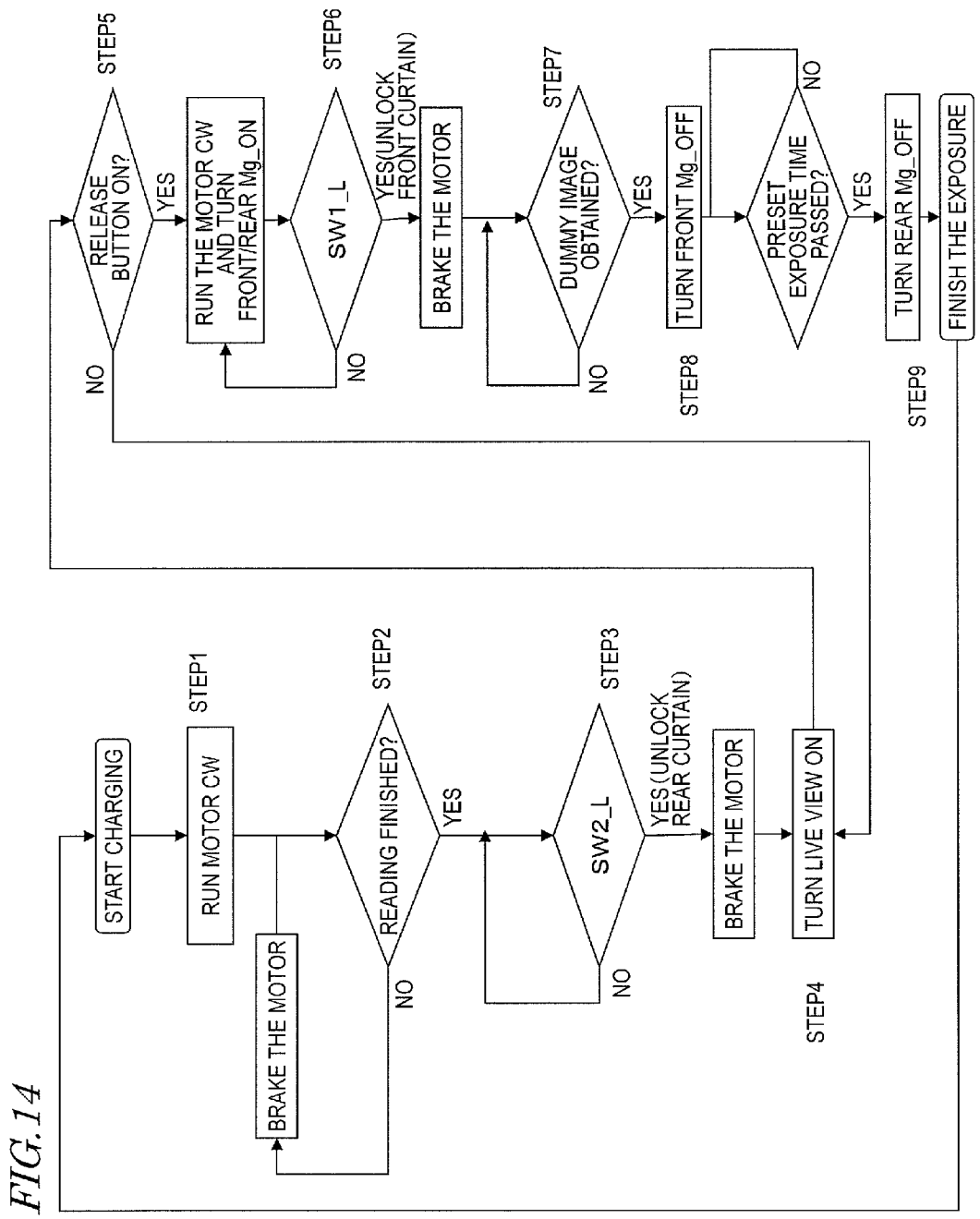
FIG. 14 is a flowchart showing the procedure of a normally opened single shooting session.
Figure 16:
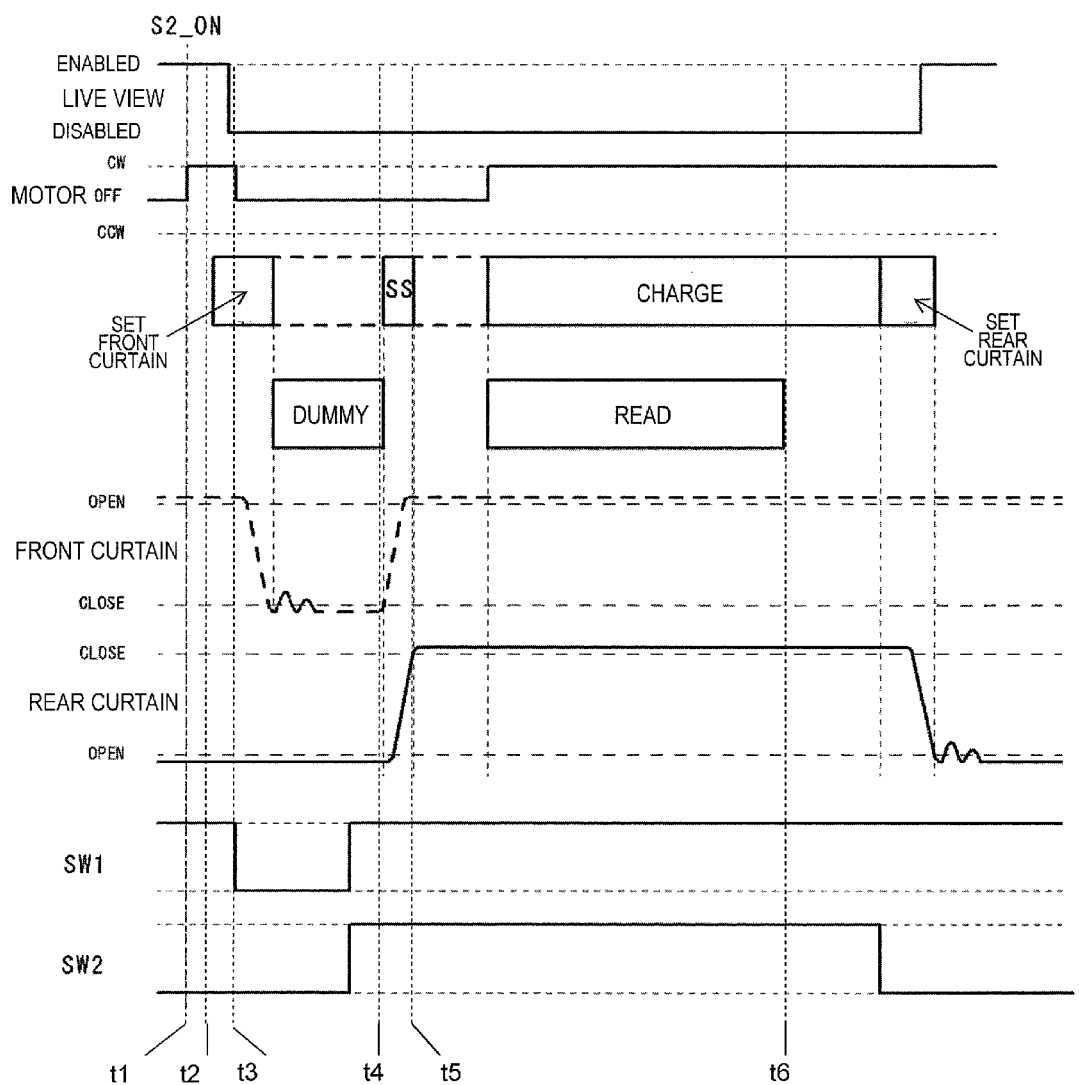
FIG. 16 is a timing diagram showing the timings of operation of a slit exposure shooting in the normally opened state.

FIG. 8 illustrates a state where the charging operation has gotten done on the front and rear curtains. FIG. 14 is a flowchart showing the procedure of a slit exposure shooting session in the normally opened state. And FIG. 16 is a timing diagram showing the timings of operation of the slit exposure shooting session in the normally opened state.

Figure 15:
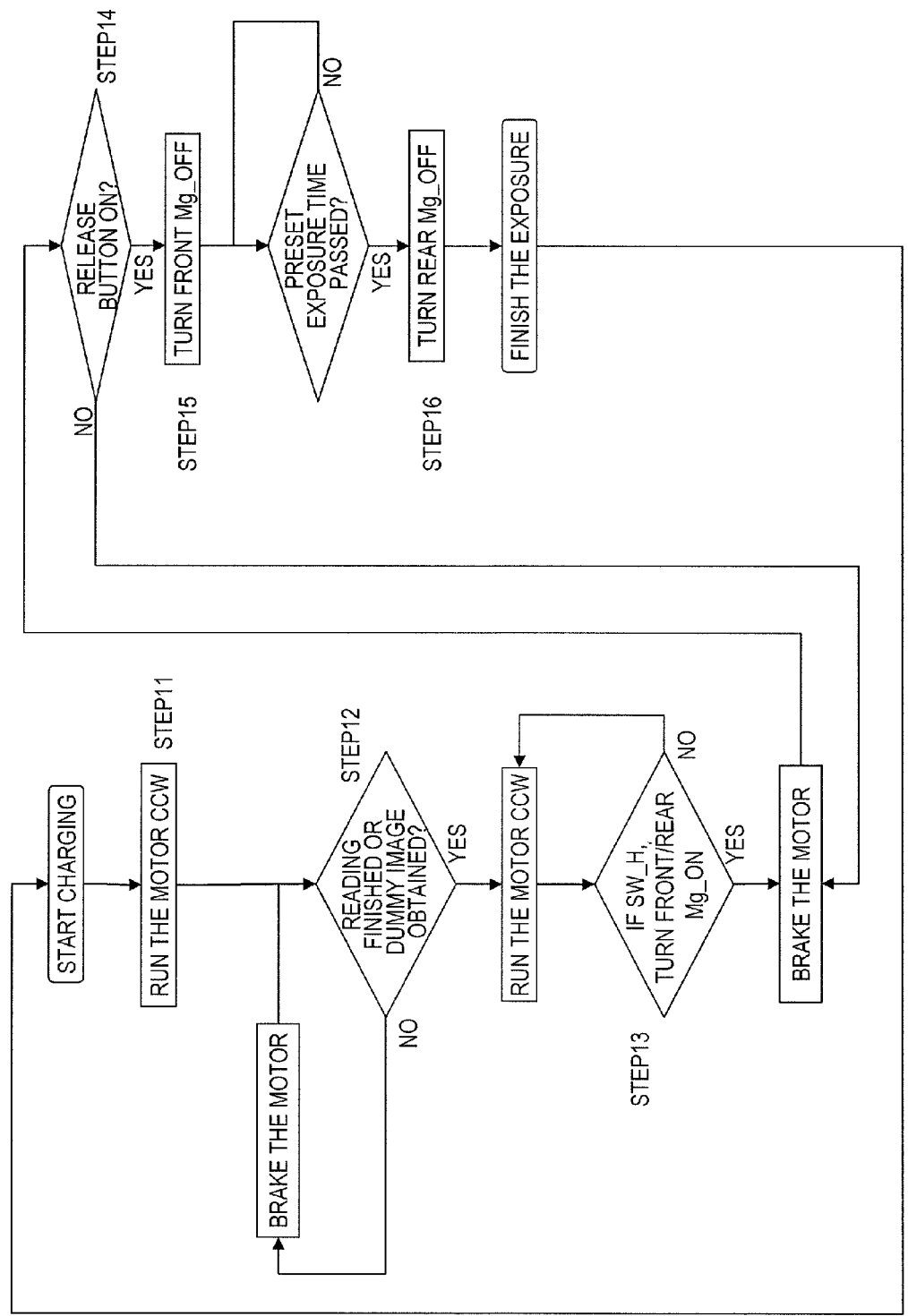
FIG. 15 is a flowchart showing the procedure of a normally closed single shooting session.
Figure 18:
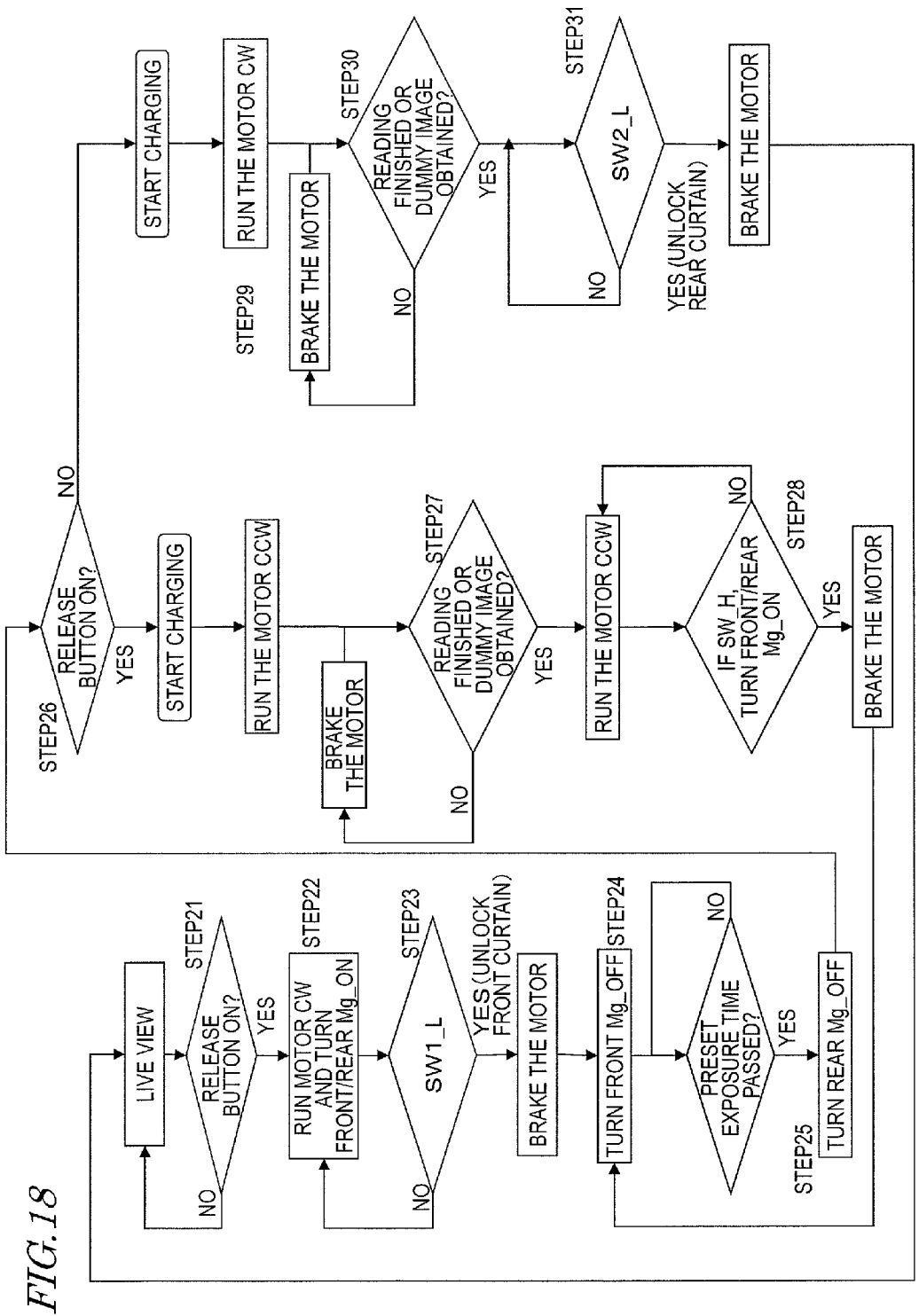
FIG. 18 is a flowchart showing the procedure of a normally closed continuous shooting session in the normally opened state.

Hereinafter, the charging operation will be described mainly with reference to FIG. 14. In FIG. 14 and FIGS. 15, 18 and so on to be referred to later, the reference sign CW stands for clockwise, the reference sign CCW stands for counterclockwise, and Mg_ON and Mg_OFF respectively mean starting and stopping supplying power to an electromagnet.

In the running finished state shown in FIGS. 6 and 7, power is supplied to the motor 46 (in STEP 1 and at the time t1 shown in FIG. 16), which rotates the worm gear 44 in the normal direction. Then the sun gear 43 with a worm wheel that engages with the worm gear 44 is turned clockwise. As a result, the planetary carrier 42 also rotates clockwise under the rotational load and the second rotation preventing portion 42b contacts with the second stopper (not shown) on the shutter base plate 11. In the meantime, the planetary gear 41 shown in FIG. 7 moves (i.e., revolves) along with its planetary carrier rotating. When the planetary gear 41 stops revolving due to contact of the second rotation preventing portion 42b with the second stopper, the planetary gear 41 is still engaged with the missing tooth gear 50. Thereafter, the planetary gear 41 itself rotates counterclockwise, thereby turning the missing tooth gear 40 clockwise. At this time, the missing tooth gear 50 tries to rotate clockwise due to slight friction between the missing tooth gear 40 and itself. However, the second rotation preventing portion 42b contacts with the missing teeth of the missing tooth gear 50, thus preventing the missing tooth gear 50 from rotating. On the other hand, the missing tooth portion of the missing tooth gear 40 gets engaged with the missing tooth gear portion 29e of the charging lever 29, thereby turning the missing tooth gear portion 29e on the charging lever shaft 29a. The charging lever 29 which forms part of the missing tooth gear portion 29e rotates counterclockwise against the biasing force applied from the charging lever returning spring 30.

As the charging lever 29 rotates, the rear curtain setting cam 29c presses the rear curtain charging input portion 34c. As a result, the rear curtain setting lever 34 rotates clockwise. When the rear curtain charging input portion 34c reaches the outermost portion of the rear curtain setting cam 29c, the rear curtain guiding piece 34b gets pressed against the rear curtain electromagnet 36. In the same way, the front curtain setting cam 29b presses the front curtain charging input portion 24c, and the front curtain setting lever 24 rotates clockwise. The front curtain charging input portion 24c is driven in the outer peripheral direction of the front curtain setting cam 29b, and the front curtain guiding piece 24b gets pressed against the front curtain electromagnet 26.

When the rear curtain setting lever 34 rotates clockwise, the rear curtain driving lever 39 also tries to rotate clockwise under the biasing force applied from the rear curtain setting spring 55. However, since the locking portion 52b of the rear curtain locking lever 52 is locked to the rear curtain driving lever locking portion 39c, the locking portion 52b prevents the rear curtain driving lever 39 from rotating. That is why only the rear curtain setting lever 34 rotates clockwise. As the rear curtain driving lever 39 does not rotate, the group of rear curtains 31 keeps the aperture 11b covered throughout the charging operation. As a result, while image data is being read from the CMOS image sensor 110, the charging operation can be carried out on the rear curtain in parallel. In this embodiment, until the charging operation gets done on the rear curtain, the group of rear curtains 31 keeps the aperture 11a covered.

Figure 9:
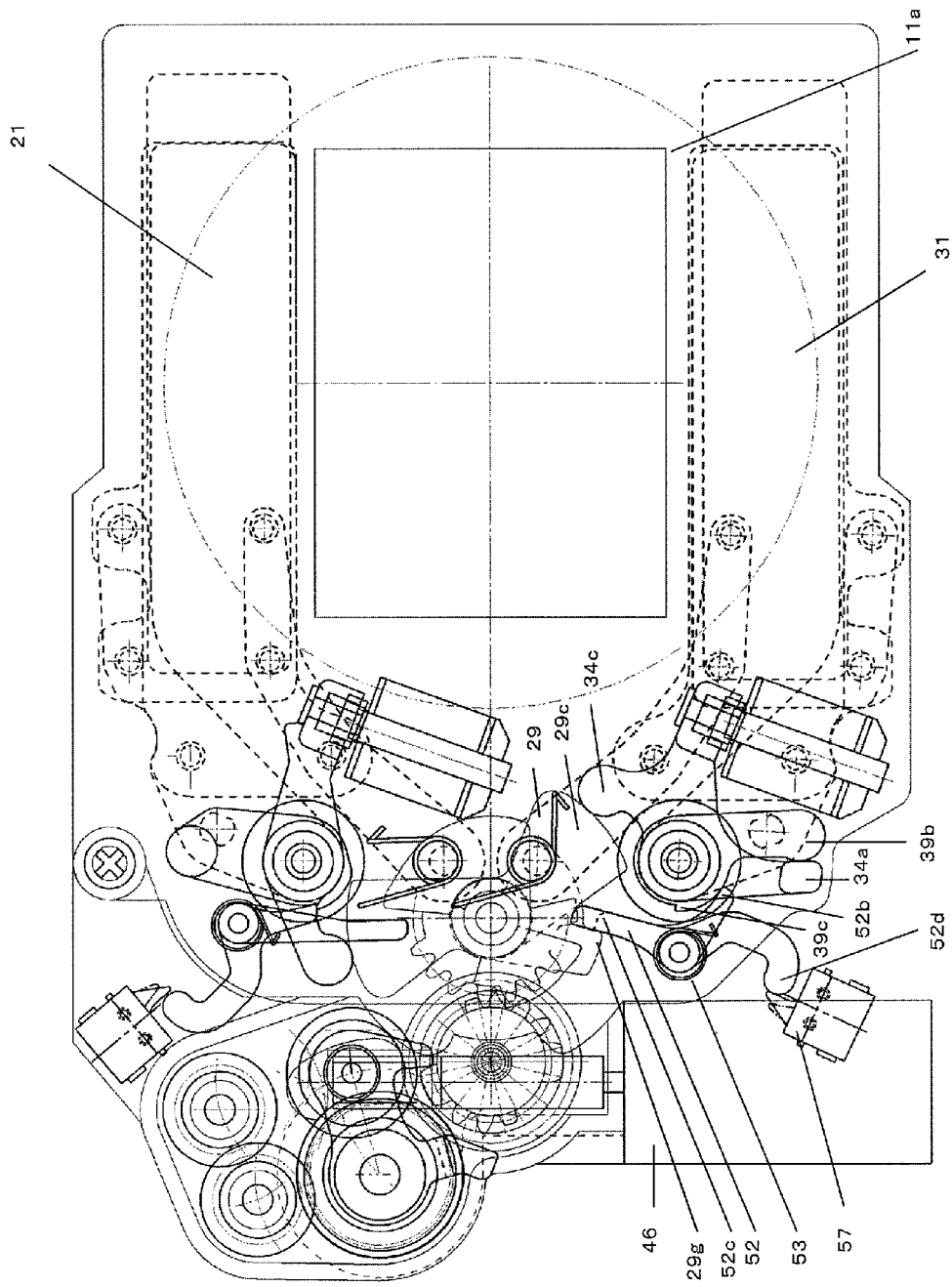
FIG. 9 illustrates how the focal plane shuttering apparatus 190 in the normally opened state looks in a live view mode.

Now take a look at FIG. 14 again. When reading from the CMOS image sensor 110 is finished (i.e., if the answer to the query of STEP 2 is YES), the motor 46 shown in FIG. 7 further rotates and the charging lever 29 further rotates counterclockwise. Then, the focal plane shuttering apparatus 190 enters the state shown in FIG. 9, which illustrates a situation where the charging operation has been performed on the front and rear curtains by getting the groups of front and rear curtains 21 and 31 retracted from the aperture 11a. In other words, FIG. 9 illustrates a state where a live view function is turned ON. The live view function may be used at the time t2 shown in FIG. 16, for example.

When an unlocking projection 29g of the charging lever 29 kicks an unlocking claw 52c of the rear curtain locking lever 52, the rear curtain locking lever 52 rotates clockwise against the biasing force applied from the rear curtain locking lever spring 53, thus unlocking the locking portion 52b from the rear curtain driving lever locking portion 39c. Then, the rear curtain driving lever 39 rotates clockwise under the biasing force applied from the rear curtain setting spring 55 until the rear curtain setting lever contacting portion 34a contacts with the rear curtain driving lever contacting portion 39b, and the group of rear curtains 31 gets retracted from the aperture 11a. In the meantime, the rear curtain unlocking sensing switch 57 is turned by a rear curtain locking lever switch turning portion 52d (in STEP 3). Then, a state where the rear curtain setting cam 29c is in contact with the rear curtain charging input portion 34c and the group of rear curtains 31 has retracted from the aperture 11a is maintained.

On the other hand, when the unlocking projection 29g of the charging lever 29 kicks the unlocking claw 52c of the rear curtain locking lever 52, the rear curtain locking lever 52 rotates clockwise against the biasing force applied from the rear curtain locking lever spring 53. In this state, the locking portion 37b of the front curtain locking lever 37 is engaged with the front curtain driving lever locking portion 28c as shown in FIG. 7, and therefore, the state where the locking portion 37b prevents the front curtain driving lever 28 from rotating is maintained. As a result, the front curtain driving lever 28 does not rotate, and the group of front curtains 21 is kept retracted from the aperture 11a throughout the charging operation.

In the state shown in FIG. 9, the light that has come from the subject is guided to the CMOS image sensor 110. Such a state is particularly effective when the CMOS image sensor 110 should be kept exposed to light for a while. For example, this state is effective particularly when the camera body 100 is used to observe or frame the subject with the live view function turned ON, shoot a movie, or perform a continuous shooting session with the AF function turned ON (in STEP 4).

As can be seen from the state shown in FIG. 9, the focal plane shuttering apparatus 190 can maintain mechanically a sate where the aperture 11a is opened. That is to say, the focal plane shuttering apparatus 190 has the so-called "normally opened" function.

It should be noted that the position of the charging lever 29 rotating is detected by the camera controller 140 (see FIG. 3) based on the number of revolutions of the motor 46. More specifically, the absolute position of the charging lever 29 rotating is detected by the camera controller 140 using the rear curtain unlocking sensing switch 57.

Slit Exposure Standby State

When the user presses the release button 131 (in STEP 5 shown in FIG. 14), the CMOS image sensor 110 gets necessary shooting information about photometry, for example. When every piece of necessary shooting information is gotten, the camera controller 140 permits the release. At this point in time, the focal plane shuttering apparatus 190 is in the state shown in FIG. 9. When the release is permitted, the focal plane shuttering apparatus 190 enters the state shown in FIG. 10, which illustrates the slit exposure standby state of the focal plane shuttering apparatus 190.

Specifically, the charging lever 29 has a fan-shaped charging lever projection 29d (see FIG. 9) and the unlocking lever 60 also has a fan-shaped unlocking lever projection 60c. The charging lever projection 29d and unlocking lever projection 60c are arranged on substantially the same radius. The unlocking lever 60 is supported rotatably on the charging lever shaft 29a. The unlocking lever 60 is biased clockwise by the charging lever returning spring 30.

A stopper (not shown) provided for the shutter base plate 11 contacts with a stopper (not shown) provided for the unlocking lever 60, thereby keeping the unlocking lever 60 from being turned by the charging lever returning spring 30. If no force other than the biasing force applied from the charging lever returning spring 30 is acting on the unlocking lever 60, the unlocking lever 60 is kept in contact with the stopper (not shown) on the shutter base plate 11 as shown in FIG. 6. At this point in time, the missing tooth gear portions 29e and 60d of the charging and unlocking levers 29 and 60 are held in the same phase.

In this embodiment, the charging lever projection 29d and unlocking lever projection 60c are arranged so as to leave a gap between them in the rotating direction. Specifically, even if the charging lever 29 is rotated counterclockwise from its position shown in FIG. 6 to its position shown in FIG. 9, the charging lever projection 29d does not contact with the unlocking lever projection 60c and only the charging lever 29 rotates. On the other hand, if the unlocking lever 60 is rotated counterclockwise, then the charging lever 29 will rotate, too, along with the unlocking lever 60. That is to say, the charging lever 29 with the charging lever projection 29d and the unlocking lever 60 with the unlocking lever projection 60c are configured to rotate on the same shaft (i.e., on the charging lever shaft 29a), and either only the charging lever 29 or both of the charging and unlocking levers 29 and 60 are selectively rotated according to the rotating direction of the motor 46.

Specifically, if the unlocking lever 60 is turned counterclockwise by the missing tooth gear 50, the charging lever 29 also rotates counterclockwise along with the unlocking lever 60, because the unlocking lever projection 60c is in contact with the charging lever projection 29d. As a result, the charging lever returning spring 30 is rotated in a direction in which biasing force is applied to the spring 30. Consequently, the charging lever returning spring 30 is charged.

In this description, the charging lever projection 29d and unlocking lever projection 60c will be sometimes collectively referred to herein as a "driving portion". The driving portion charges the groups of front and rear curtains 21 and 31 by using the driving force of the motor. Specifically, the driving portion charges the groups of front and rear curtains 21 and 31 at mutually different timings according to the rotating direction of the motor in the following manner.

If the motor 46 is further run in the state shown in FIG. 9, the charging lever 29 further rotates counterclockwise, and the charging lever projection 29d presses the unlocking lever projection 60c, thereby turning the unlocking lever 60 counterclockwise against the biasing force applied from the charging lever returning spring 30.

As the unlocking lever 60 rotates counterclockwise, the front curtain unlocking projection 60a soon kicks the unlocking claw 37c of the front curtain locking lever 37, when the front curtain locking lever 37 rotates clockwise against the biasing force applied from the front curtain locking lever spring 54, thus unlocking the locking portion 37b from the front curtain driving lever locking portion 28c. Then, the front curtain driving lever 28 rotates clockwise under the biasing force applied from the front curtain setting spring 27 until the front curtain setting lever contacting portion 24a contacts with the front curtain driving lever contacting portion 28b, and the group of front curtains 21 covers the aperture 11a. Then, a state where the front curtain setting cam 29b is in contact with the front curtain charging input portion 24c and the group of front curtains 21 covers the aperture 11a is maintained. At the same time, the front curtain locking lever switch turning portion 37d turns ON the front curtain unlocking sensing switch 47 (in STEP 6 shown in FIG. 14 and at the time t3 shown in FIG. 16).

As the motor 46 is further run and as the charging lever 29 further rotates counterclockwise, the missing tooth gear 40 soon disengages itself from the charging lever missing tooth gear portion 29e. As a result, the charging lever 29 and the unlocking lever 60 both rotate clockwise under the biasing force applied from the charging lever returning spring 30. In the meantime, the front curtain charging input portion 24c breaks off contact with the front curtain setting cam 29b and the rear curtain charging input portion 34c breaks off contact with the rear curtain setting cam 29c.

Before the missing tooth gear 40 disengages itself from the charging lever missing tooth gear portion 29e of the charging lever 29, power starts to be supplied to the front and rear curtain electromagnets 26 and 36. As a result, the front and rear curtain guiding pieces 24b and 34b get attracted to the front and rear curtain electromagnets 26 and 36, respectively. In this manner, the front and rear curtain setting levers 24 and 34 can maintain the charged state.

At a point in time when the group of front curtains 21 covers the aperture 11a, the CMOS image sensor 110 gets a reference image (i.e., a so-called "dummy image") to reduce a variation in image between respective objects (in STEP 7 and at the time t4 shown in FIG. 16).

Slit Exposure

In response to a release instruction issued by the camera controller 140, the supply of power to the front curtain electromagnet 26 is cut off (in STEP 8). Then, the front curtain setting lever 24 rotates counterclockwise under the biasing force applied from the front curtain traveling spring 25. At this time, the front curtain driving lever 28 also rotates along with the front curtain setting lever 24 to run the group of front curtains 21. And the CMOS image sensor 110 starts to be exposed to light from under the aperture 11a. Subsequently, when a preset exposure time passes since the supply of power to the front curtain electromagnet 26 was cut off, the supply of power to the rear curtain electromagnet 36 is cut off this time (in STEP 9 and at the time t5 shown in FIG. 16). The exposure time is set by the camera controller 140 by reference to exposure information and other pieces of information. Then, the rear curtain setting lever 34 rotates counterclockwise under the biasing force applied from the rear curtain traveling spring 35. At this time, the rear curtain driving lever 39 also rotates along with the rear curtain setting lever 34 to run the group of rear curtains 31 and cover the aperture 11a from under the aperture 11a. And the CMOS image sensor 110 starts to be exposed to light that has come through a slit formed by the groups of front and rear curtains 21 and 31. An exposing operation using light that has come through such a slit will be referred to herein as "slit exposure shooting". When the groups of front and rear curtains 21 and 31 have run, the focal plane shuttering apparatus 190 will be back to the state shown in FIG. 6 again. After that, the charging operation will be performed to make the focal plane shuttering apparatus 190 enter the state shown in FIG. 8. In parallel with the rear curtain charging operation shown in FIG. 8, the camera controller 140 performs a control operation so as to read the image data that has been gotten by the CMOS image sensor 110. After the image data has been read, the focal plane shuttering apparatus 190 will enter the state shown in FIG. 9 to prepare for the next shooting session (at the time t6 shown in FIG. 16). By performing the charging operation and the read operation in parallel in this manner, the time it takes to prepare for the next shooting session can be shortened. For example, the interval between continuous shooting sessions can be shortened and continuous shooting can be carried out at high speeds even in the AF mode.

It should be noted that when the group of rear curtains 31 has run, the locking portion 52b of the rear curtain locking lever 52 will be locked to the rear curtain driving lever locking portion 39c as shown in FIG. 6.

Normally Closed Charging Mechanism

Next, a normally closed charging mechanism will be described.

The components of the focal plane shuttering apparatus 190 that form the normally closed charging mechanism are quite the same as the components of the focal plane shuttering apparatus 190 that form the normally opened charging mechanism. Thus, those components will not be described in detail all over again to avoid redundancies.

As shown in FIG. 7, the unlocking lever missing tooth gear portion 60d is supported along with the unlocking lever 60. The unlocking lever missing tooth gear portion 60d is engageable with the missing tooth gear 50, which is supported rotatably on the shutter base plate 11. The missing tooth gear 50 is comprised of stacked gears and has a gear portion, which has teeth over the entire periphery thereof and which is engageable with a group of coupled gears 48. The group of coupled gears 48 is made up of three gears that are engaged in series with each other. One of the three gears that form the group of coupled gears 48 is engageable at one end with the planetary gear 41. Another one of the three gears at the other end has the same shaft as the sun gear 43 and is rotatable on that shaft and engageable with the missing tooth gear 50.

Running Finished State

Figure 11:
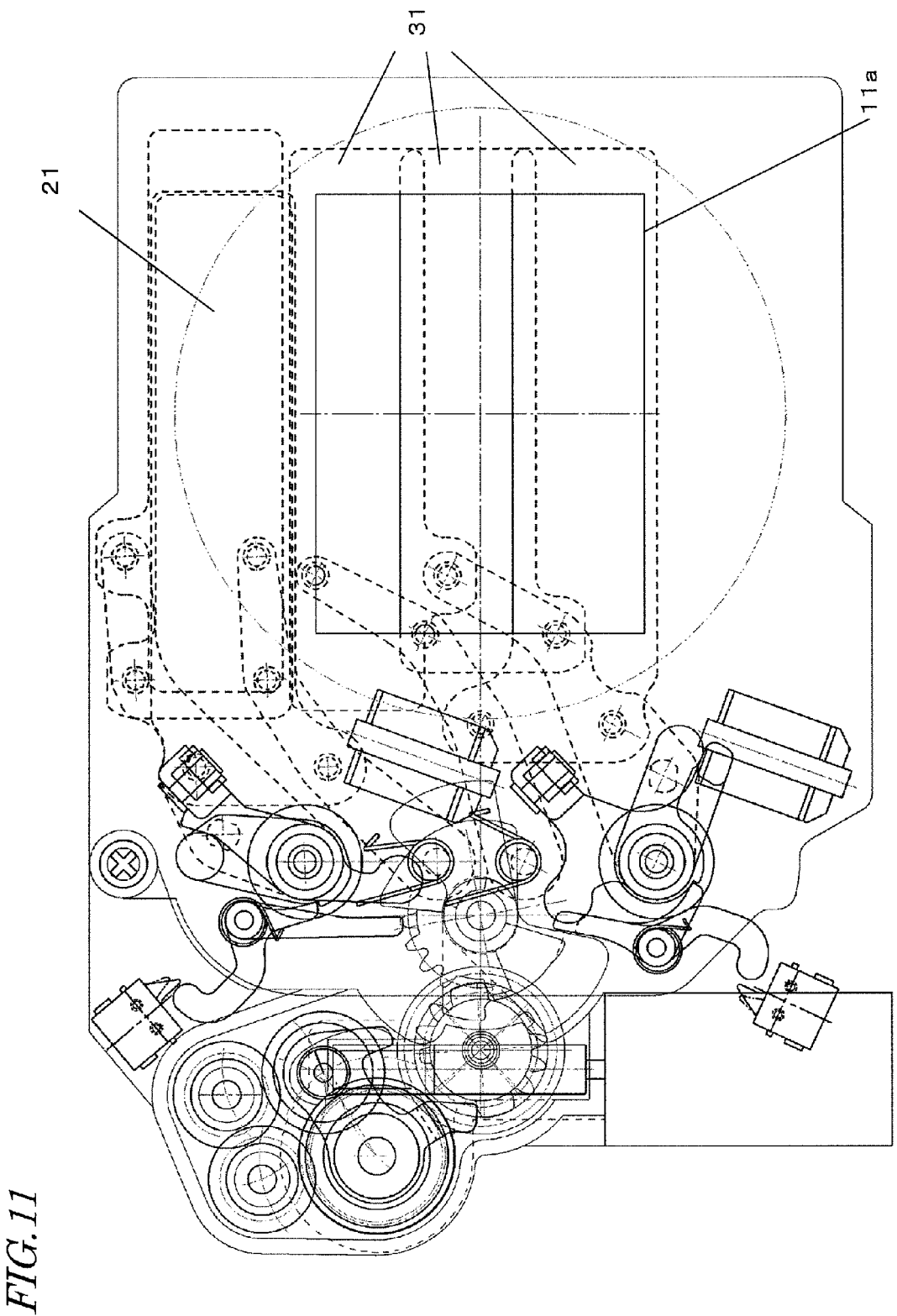
FIG. 11 illustrates how the focal plane shuttering apparatus 190 in a normally closed state looks when its rear curtain finishes running.

FIG. 11 illustrates a state where the focal plane shuttering apparatus has gotten a shooting session done (i.e., a state where the rear curtain has run).

The group of front curtains 21 has gotten retracted to over the aperture 11a under the biasing force applied from the front curtain traveling spring 25. On the other hand, as shown in FIG. 11, the front curtain setting and driving levers 24 and 28 have their contacting portions 24a and 28b kept in contact with each other under the biasing forces applied from the front curtain setting and traveling springs 27 and 25, and both stay in their counterclockwise rotated positions. Meanwhile, the group of rear curtains 31 covers the aperture 11a under the biasing force applied from the rear curtain traveling spring 35. On the other hand, the rear curtain setting and driving levers 34 and 39 have their contacting portions 34a and 39b kept in contact with each other under the biasing force applied from the rear curtain traveling spring 35, and both stay in their counterclockwise rotated positions.

Charging Operation

Figure 12:
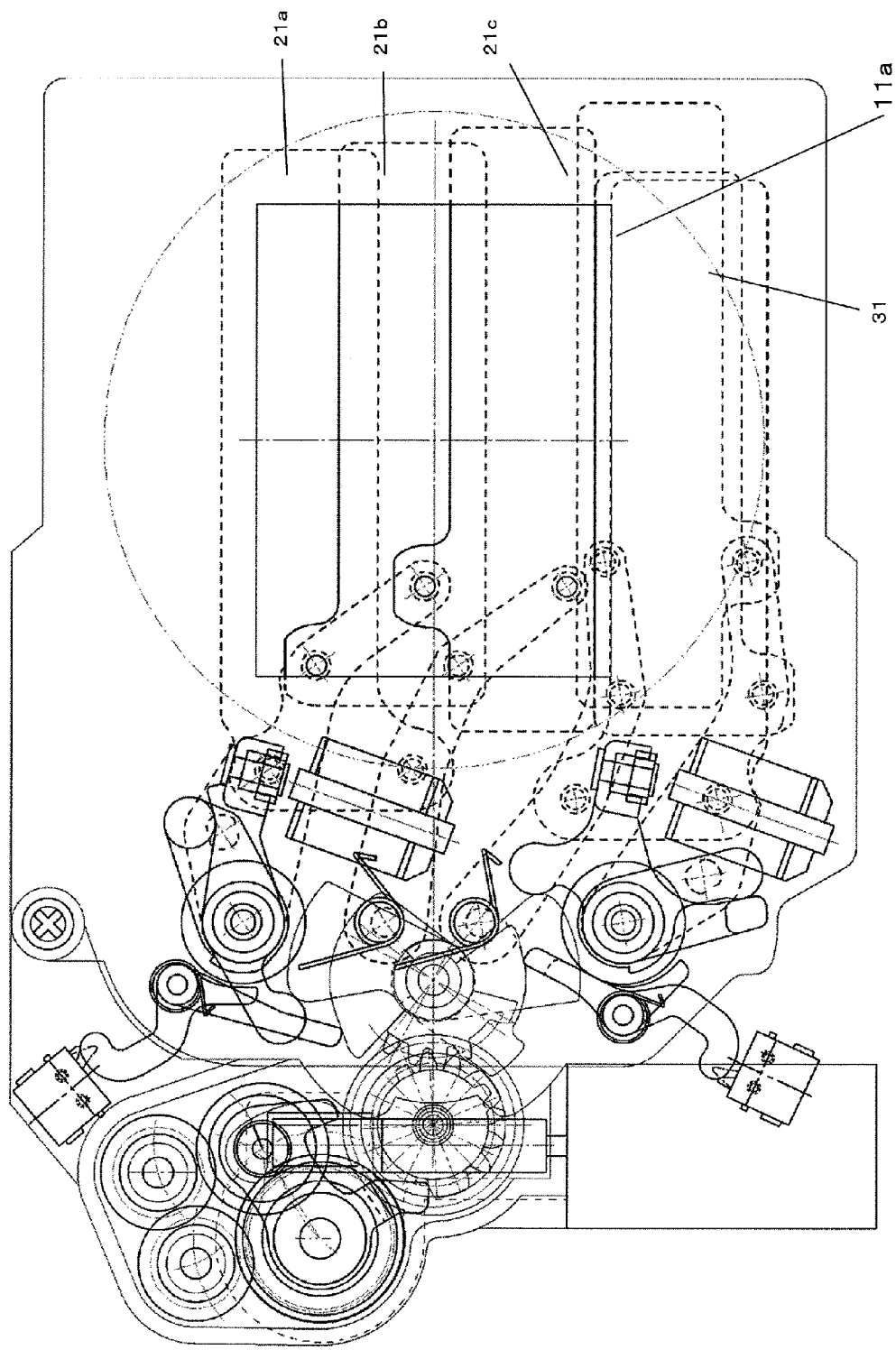
FIG. 12 illustrates how the focal plane shuttering apparatus 190 in the normally closed state looks during a charging operation.
Figure 13:
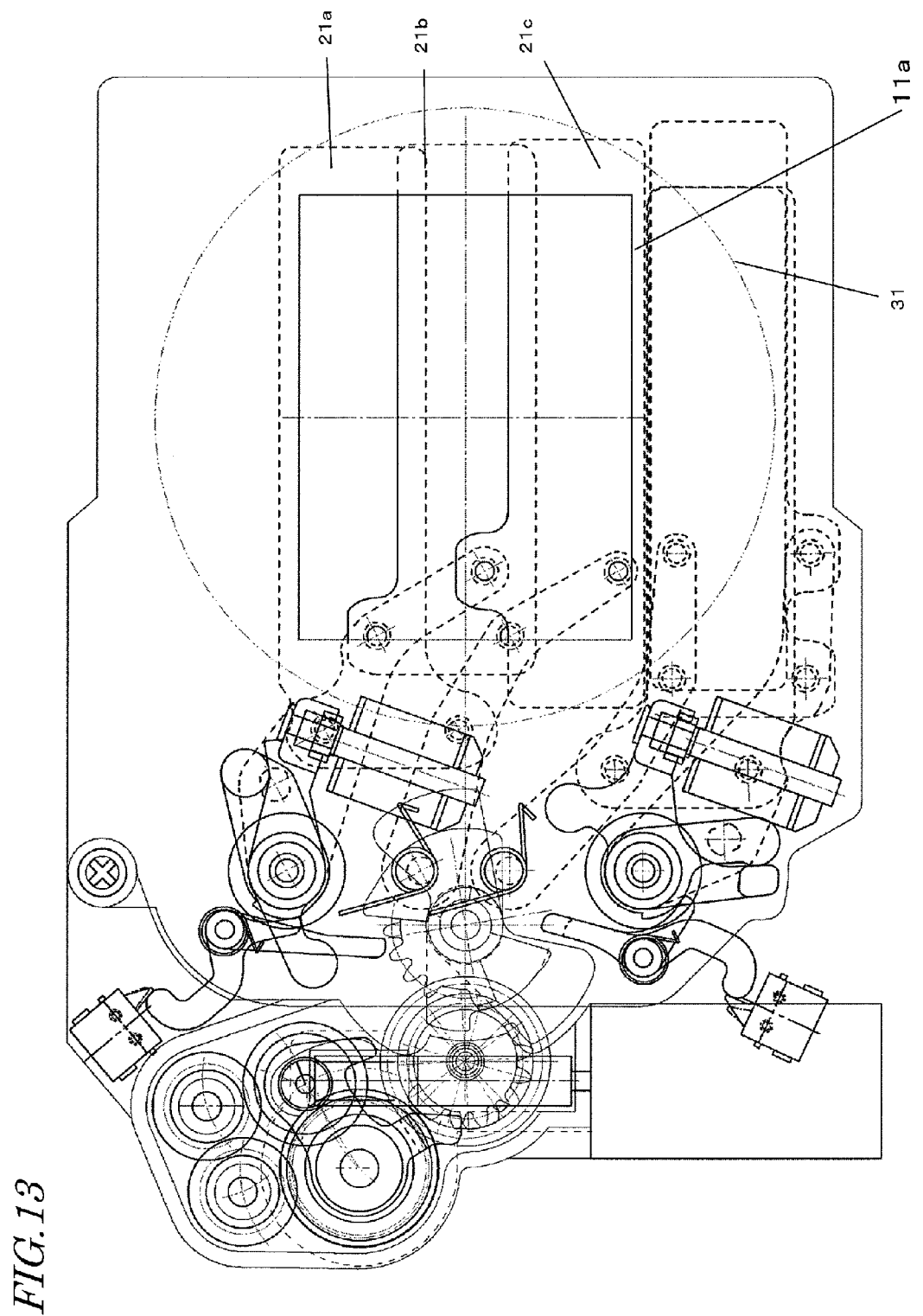
FIG. 13 illustrates how the focal plane shuttering apparatus 190 in the normally closed state looks in a slit exposure shooting standby mode.

FIG. 11 illustrates a state where the rear curtain has run in the normally closed state. FIG. 12 illustrates a state during a charging operation. FIG. 13 illustrates a shooting standby state where the charging operation has gotten done on the front and rear curtains. FIG. 15 is a flowchart showing the procedure of a slit exposure shooting session in the normally closed state. And FIG. 17 is a timing diagram showing the timings of operation of the slit exposure shooting session in the normally closed state.

Hereinafter, the charging operation will be described mainly with reference to FIG. 15.

Figure 17:
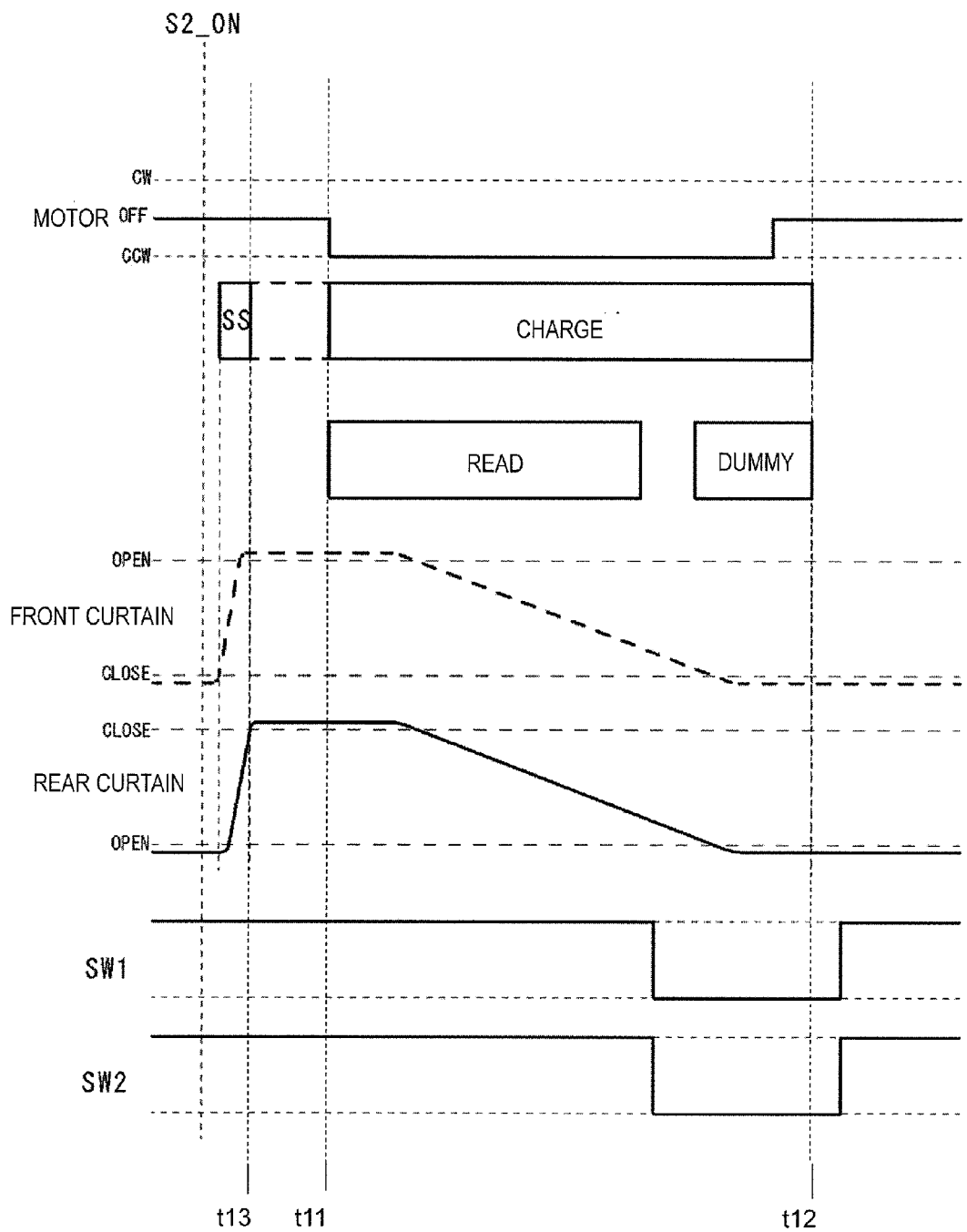
FIG. 17 is a timing diagram showing the timings of operation of a slit exposure shooting in the normally closed state.

In the running finished state shown in FIG. 11, power is supplied to the motor 46 so that the motor 46 turns in the opposite direction from in the normally opened state (in STEP 11 and at the time t11 shown in FIG. 17). When the motor 46 rotates the worm gear 44, the sun gear 43 with a worm wheel that engages with the worm gear 44 is turned counterclockwise. As a result, the planetary carrier 42 also rotates counterclockwise under the rotational load and the first rotation preventing portion 42a contacts with the first stopper (not shown) on the shutter base plate 11. In the meantime, the planetary gear 41 shown in FIG. 7 moves (i.e., revolves) along with its planetary carrier rotating. When the planetary gear 41 stops revolving due to contact of the first rotation preventing portion 42a with the first stopper, the planetary gear 41 is still engaged with the coupled gear 48. Thereafter, the planetary gear 41 itself rotates clockwise, thereby turning the coupled gear 48 and the missing tooth gear 50 clockwise. At this time, the missing tooth gear 40 tries to rotate clockwise due to slight friction between the missing tooth gear 50 and itself. However, the first rotation preventing portion 42a contacts with the missing teeth of the missing tooth gear 40, thus preventing the missing tooth gear 40 from rotating. On the other hand, the missing tooth portion of the missing tooth gear 50 gets engaged with the unlocking lever missing tooth gear portion 60d of the unlocking lever 60, thereby turning the unlocking lever missing tooth gear portion 60d counterclockwise on the charging lever shaft 29a. The unlocking lever 60 which forms part of the missing tooth gear portion 60d rotates counterclockwise against the biasing force applied from the charging lever returning spring 30.

As the unlocking lever 60 rotates, the charging lever 29 rotates counterclockwise and the rear curtain setting cam 29c presses the rear curtain charging input portion 34c. As a result, the rear curtain setting lever 34 rotates clockwise.

When the front and rear curtain unlocking portions 60a and 60b of the unlocking lever 60 kick the unlocking claws 37e and 52e, respectively, substantially at the same time, the front and rear curtain locking levers 37 and 52 rotate clockwise against the biasing forces applied from the front and rear curtain locking lever springs 54 and 53, respectively.

The front curtain driving lever 28 has its locking portion 28c disengaged from the locking portion 37b of the front curtain locking lever 37. Meanwhile, the rear curtain driving lever 39 has its locking portion 39c disengaged from the locking portion 52b of the rear curtain locking lever 52. And under the biasing force applied from the front curtain setting spring 27, the contacting portion 24a of the front curtain setting lever 24 contacts with the contacting portion 28b of the front curtain driving lever 28. As a result, the front curtain setting lever 24 rotates along with the front curtain driving lever 28. On the other hand, under the biasing force applied from the rear curtain setting spring 55, the contacting portion 34a of the rear curtain setting lever 34 contacts with the coupling pin 39a of the rear curtain driving lever 39. As a result, the rear curtain setting lever 34 rotates along with the rear curtain driving lever 39. Consequently, the front and rear curtain locking lever switch turning portions 37d and 52d turn ON the front and rear curtain unlocking sensing switches 47 and 57, respectively, substantially at the same time (in STEP 13).

FIG. 12 illustrates a state during the charging operation. As shown in FIG. 12, the aperture 11a is always covered with the groups of front and rear curtains 21 and 31 throughout the charging operation. As a result, reading image data from the CMOS image sensor 110 and getting a dummy image (in STEP 12 and at the time t12 shown in FIG. 17) can be performed in parallel with the charging operation.

When the rear curtain charging input portion 34c reaches the outermost portion of the rear curtain setting cam 29c, the rear curtain guiding piece 34b gets pressed against the rear curtain electromagnet 36. In the same way, the front curtain setting cam 29b presses the front curtain charging input portion 24c, and the front curtain setting lever 24 rotates clockwise. The front curtain charging input portion 24c is driven in the outer peripheral direction of the front curtain setting cam

29b and reaches the outermost portion, when the front curtain guiding piece 24b gets pressed against the front curtain electromagnet 26.

Consequently, this focal plane shuttering apparatus has a so-called "normally closed" function to keep the aperture 11a always closed except during exposure.

Slit Exposure Standby State

FIG. 13 illustrates a slit exposure standby state of the focal plane shuttering apparatus 190.

Specifically, as the motor 46 is further run in the state shown in FIG. 12 and as the unlocking lever 60 further rotates counterclockwise, the missing tooth gear 50 soon disengages itself from the unlocking lever missing tooth gear portion 60d. As a result, the unlocking lever 60 and the charging lever 29 both rotate clockwise under the biasing force applied from the charging lever returning spring 30. In the meantime, the front curtain charging input portion 24c breaks off contact with the front curtain setting cam 29b and the rear curtain charging input portion 34c breaks off contact with the rear curtain setting cam 29c.

Before the missing tooth gear 50 disengages itself from the missing tooth gear portion 60d of the unlocking lever 60, power starts to be supplied to the front and rear curtain electromagnets 26 and 36. As a result, the front and rear curtain guiding pieces 24b and 34b get attracted to the front and rear curtain electromagnets 26 and 36, respectively. In this manner, the front and rear curtain setting levers 24 and 34 can maintain the charged state (in the period between the times t11 and t12 shown in FIG. 17).

Slit Exposure

When the user presses the release button 131, the CMOS image sensor 110 gets necessary shooting information about photometry, for example. When every piece of necessary shooting information is gotten, the camera controller 140 permits the release. In response to a release instruction issued by the camera controller 140 (in STEP 14), the supply of power to the front curtain electromagnet 26 is cut off (in STEP 15). Then, the front curtain setting lever 24 rotates counterclockwise under the biasing force applied from the front curtain traveling spring 25. At this time, the front curtain driving lever 28 also rotates along with the front curtain setting lever 24 to run the group of front curtains 21. And the CMOS image sensor 110 starts to be exposed to light from under the aperture 11a. Subsequently, when a preset exposure time passes since the supply of power to the front curtain electromagnet 26 was cut off, the supply of power to the rear curtain electromagnet 36 is cut off this time (in STEP 16). The exposure time is set by the camera controller 140 by reference to exposure information and other pieces of information. Then, the rear curtain setting lever 34 rotates counterclockwise under the biasing force applied from the rear curtain traveling spring 35. At this time, the rear curtain driving lever 39 also rotates along with the rear curtain setting lever 34 to run the group of rear curtains 31 and cover the aperture 11a from under the aperture 11a. And the CMOS image sensor 110 starts to be exposed to light that has come through a slit formed by the groups of front and rear curtains 21 and 31 (at the time t13 shown in FIG. 17). An exposing operation using light that has come through such a slit will be referred to herein as "slit exposure shooting". When the groups of front and rear curtains 21 and 31 have run, the focal plane shuttering apparatus 190 will be back to the state shown in FIG. 11 again.

(3: Normally Closed Continuous Shooting Session in Normally Opened State)

Next, it will be described how to carry out a normally closed continuous shooting session in the normally opened state. Since a sequence in the normally closed state can get done more quickly than a sequence in the normally opened state, continuous shooting can be carried out at very high speeds when AF is not needed during that continuous shooting, for example.

Figure 19:
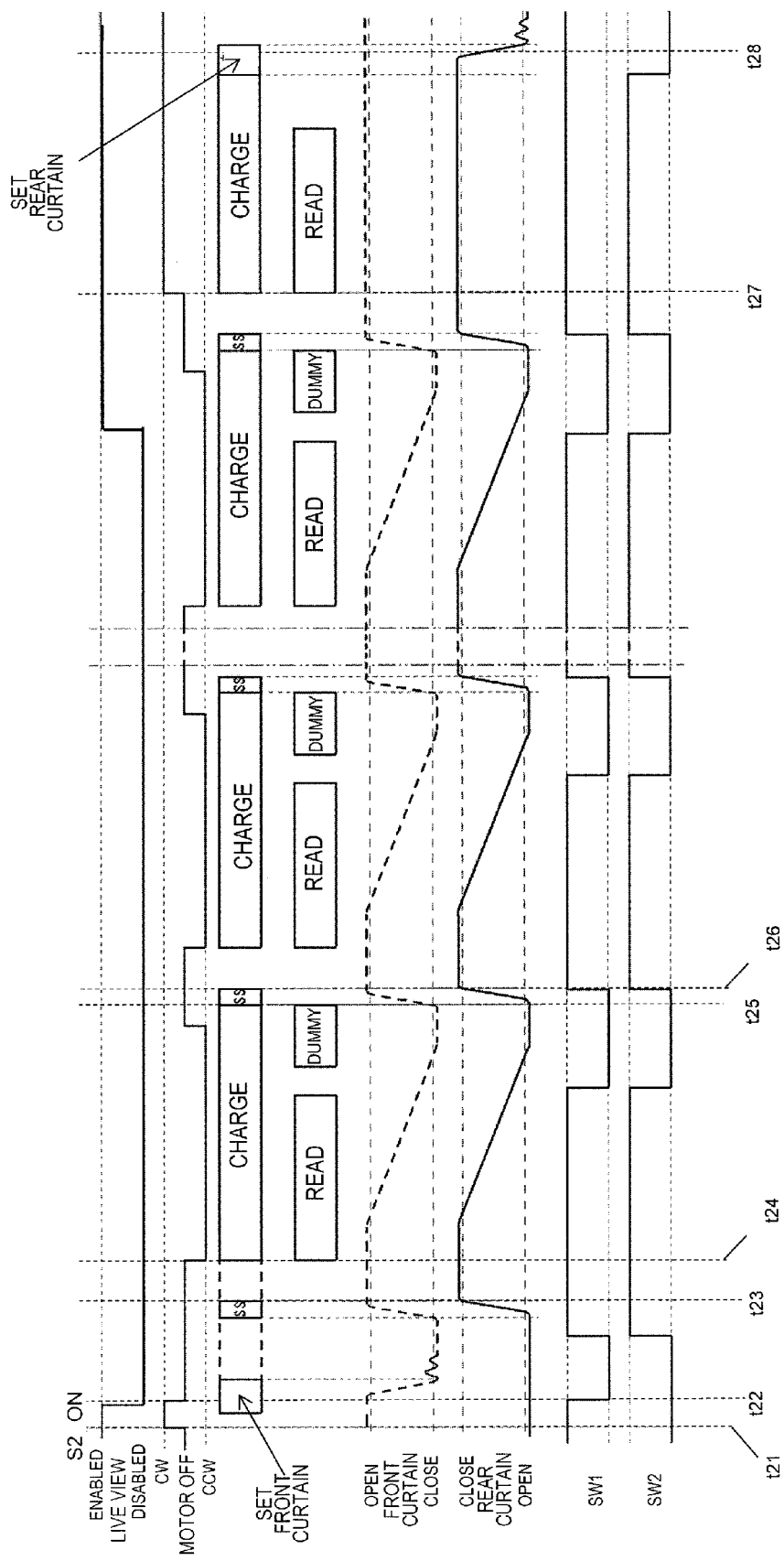
FIG. 19 is a timing diagram showing the timings of operation of the normally closed continuous shooting session in the normally opened state.

FIG. 18 is a flowchart showing the procedure of a normally closed continuous shooting session to be carried out in the normally opened state. FIG. 19 is a timing diagram showing the timings of operation of the normally closed continuous shooting session to be carried out in the normally opened state.

Hereinafter, it will be described with reference to FIG. 18 how this focal plane shuttering apparatus operates in a situation where the user has selected a high-speed continuous shooting mode that uses the normally closed technique in a live view mode in the normally opened state and has pressed the release button.

When the release button 131 is pressed (in STEP 21), power starts to be supplied to the front and rear curtain electromagnets 26 and 36 in accordance with a release instruction issued by the camera controller 140. The motor 46 runs in the rotating direction for the normally opened state, thus getting the front and rear curtain guiding pieces 24b and 34b attracted to the front and rear curtain electromagnets 26 and 36, respectively. At substantially the same time, the motor 46 runs in the rotating direction for the normally opened state (in STEP 21 and at the time t21 shown in FIG. 19). As the charging lever 29 rotates counterclockwise, the front curtain unlocking projection 60a kicks the unlocking claw A 37c of the front curtain locking lever 37, thus turning the front curtain locking lever 37 against the biasing force applied from the front curtain locking lever spring 54 to unlock the locking portion 37b from the front curtain driving lever locking portion 28c. Then, under the biasing force applied from the front curtain setting spring 27, the front curtain driving lever 28 rotates clockwise until the front curtain setting lever contacting portion 24a contacts with the front curtain driving lever contacting portion 28b, and the group of front curtains 21 covers the aperture 11a. And the front curtain setting cam 29b is in contact with the front curtain charging input portion 24c, and the group of front curtains 21 keeps covering the aperture 11a. At the same time, the front curtain locking lever switch turning portion 37d turns ON the front curtain unlocking sensing switch 47 (in STEP 23) and stops running the motor 46 (at the time t22 shown in FIG. 19).

The power that has been supplied to the front curtain electromagnet 26 is cut off (in STEP 24), when the front curtain setting lever 24 rotates counterclockwise under the biasing force applied from the front curtain traveling spring 25. At this time, the front curtain driving lever 28 also rotates along with the front curtain setting lever 24 to run the group of front curtains 21. And the CMOS image sensor 110 starts to be exposed to light from under the aperture 11a. Subsequently, when a preset exposure time passes since the supply of power to the front curtain electromagnet 26 was cut off, the supply of power to the rear curtain electromagnet 36 is cut off this time (in STEP 25). The exposure time is set by the camera controller 140 by reference to exposure information and other pieces of information. Then, the rear curtain setting lever 34 rotates counterclockwise under the biasing force applied from the rear curtain traveling spring 35. At this time, the rear curtain driving lever 39 also rotates along with the rear curtain setting lever 34 to run the group of rear curtains 31 and cover the aperture 11a from under the aperture 11a. And the CMOS image sensor 110 starts to be exposed to light that has come through a slit formed by the groups of front and rear curtains 21 and 31. When the groups of front and rear curtains 21 and 31 have run, the focal plane shuttering apparatus 190 will be back to the state shown in FIG. 6 again (at the time t23 shown in FIG. 19).

In this case, if the release button 131 is still ON (in STEP 26), the motor 46 is run in the rotating direction for the normally closed state. As described above, the aperture 11a is always covered during charging as in the charging operation to be performed in the normally closed state. That is why reading image data from the CMOS image sensor 110 and getting the dummy image (in STEP 27) are carried out in parallel with the charging operation (at the time t24 shown in FIG. 19).

When reading from the image sensor is done (at the time t25 shown in FIG. 19), the motor 46 further runs, and the front or rear curtain locking lever switch turning portion 37d or 52d senses the turn ON of the front or rear curtain unlocking sensing switch 47 or 57 (in STEP 28). Then, the motor 46 is stopped and the process advances to STEP 24, in which an exposure process is carried out all over again (at the time t26 shown in FIG. 19).

If it turns out in STEP 26 that the release button 131 has been turned OFF, the continuous shooting session needs to be stopped to recover the live view state.

In that case, the motor 46 is run in the rotating direction for the normally opened state (in STEP 29 and at the time t27 shown in FIG. 19). Even though the groups of front and rear curtains 21 and 31 are charged, it is the same as the charging operation in the normally opened state and the group of rear curtains 31 covers the aperture 11a. That is why image data can be read from the CMOS image sensor 110. When reading from the CMOS image sensor 110 and getting the dummy image are done (in STEP 30), the motor 46 further runs and the charging lever 29 further rotates counterclockwise. Then, the focal plane shuttering apparatus 190 enters the state shown in FIG. 9, in which the charging operation has been done on the front and rear curtains to realize the live view function (at the time t28 shown in FIG. 19).

Portion (a) of FIG. 20 is a partial cross-sectional view of the focal plane shuttering apparatus 190 in the normally opened state, while portion (b) of FIG. 20 is a partial cross-sectional view of the focal plane shuttering apparatus 190 in the normally closed state.

As can be seen from the foregoing description, the focal plane shuttering apparatus 190 of this embodiment may be implemented as either a normally opened focal plane shuttering apparatus which can make a slit exposure using front and rear curtains and which can keep the aperture covered with the front curtain retracted while charging the front and rear curtains or a normally closed focal plane shuttering apparatus which can always keep the aperture closed except during a slit exposure that uses the front and rear curtains. Thus, the normally opened mode can be used in performing continuous shooting sessions with AF kept ON, and the normally closed mode can be used in performing continuous shooting sessions at higher speeds. Furthermore, the focal plane shuttering apparatus 190 of this embodiment can be used even in a so-called "single-lens reflex camera" that realizes an optical viewfinder by arranging a quick turn mirror in the optical path for shooting and in a so-called "mirrorless single lens camera" that can get a live viewfinder shooting done by an image sensor without arranging any quick turn mirror.

Although various embodiments have been described herein as just examples of the technique of the present disclosure, various modifications, replacements, additions or omissions can be readily made on those embodiments as needed and the present disclosure is intended to cover all of those variations. Also, a new embodiment can also be created by combining respective elements that have been described for those embodiments disclosed herein.

Thus, some other embodiments will be described.

The embodiment described above is an interchangeable lens type digital camera, of which the camera body 100 and lens unit 200 are separable from each other. However, the same effects can also be achieved by a digital camera of which the lens unit is fixed on its camera body and in which exposure is controlled by the focal plane shuttering apparatus.

Although a slit exposure has been described in the foregoing description of embodiments, an electronic front curtain exposure can be carried out just by turning ON only the rear curtain Mg at the front curtain/rear curtain Mg_ON timing in each flowchart.

In FIGS. 1 to 5, the camera body 100 is illustrated as an image capture device. After the camera body 100 has finished a shooting session, the camera controller 140 of the camera body 100 can change the methods to drive the focal plane shuttering apparatus 190 into any of various methods.

For example, after the camera body 100 has finished the shooting session, the camera controller 140 may control the focal plane shuttering apparatus 190 so that the apparatus 190 is driven by a normally opened driving method.

If the modes of operation of the camera body 100 are changed by the user from a single shooting mode into a continuous shooting mode, or vice versa, the camera controller 140 may detect the change of the modes of operation and may change the methods to drive the focal plane shuttering apparatus 190. Specifically, if the modes of operation are changed into the single shooting mode, the camera controller 140 may change the methods to drive the focal plane shuttering apparatus 190 into a normally opened driving method. On the other hand, if the modes of operation are changed into the continuous shooting mode, the camera controller 140 may change the methods to drive the focal plane shuttering apparatus 190 into a normally closed driving method.

In a situation where the continuous shooting mode described above is subdivided into multiple modes with mutually different shooting intervals, when a continuous shooting mode with the longest shooting interval is selected, the camera controller 140 may change the methods to drive the focal plane shuttering apparatus 190 into the normally closed driving method. But when a different continuous shooting mode is selected, the camera controller 140 may change the methods to drive the focal plane shuttering apparatus 190 into the normally opened driving method.

Furthermore, if the power supply unit is disconnected from the power supplying section during a shooting session and then restarts supplying power to the power supplying section, the camera controller 140 may change the methods to drive the focal plane shuttering apparatus 190 into the normally closed driving method. Or if the power supplying ability of the power supply unit turns out to be less than a predetermined power value while a continuous shooting session is carried out by the normally closed driving method, the camera controller 140 may change the methods to drive the focal plane shuttering apparatus 190 into the normally opened driving method and then stop performing the continuous shooting session. Optionally, the ratio of remaining power to the maximum permissible power may be defined instead of the predetermined power value.

Alternatively, when the power supply unit starts supplying power, the camera controller 140 may change the methods to drive the focal plane shuttering apparatus 190 into the normally opened driving method.

Various embodiments have been described as examples of the technique of the present disclosure by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The present disclosure is applicable to a focal plane shuttering apparatus.

While the present disclosure has been described with respect to preferred embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A focal plane shuttering apparatus comprising:
   a shutter base plate with an aperture;
   a front curtain which is movable between a position where the front curtain covers the aperture and a position where the front curtain is retracted from the aperture;
   a first elastic member which generates biasing force to make the front curtain run in such a direction as to get the front curtain retracted from the aperture;
   a rear curtain which is movable between a position where the rear curtain covers the aperture and a position where the rear curtain is retracted from the aperture;
   a second elastic member which generates biasing force to make the rear curtain run in such a direction as to have the rear curtain cover the aperture;
   a charging member which applies biasing force to the first and second elastic members;
   a front curtain locking member which keeps the front curtain retracted from the aperture when the charging member applies biasing force to the first elastic member;
   a first switch which turns synchronously with the front curtain locking member;
   a rear curtain locking member which keeps the aperture covered with the rear curtain when the charging member applies biasing force to the second elastic member;
   a second switch which turns synchronously with the rear curtain locking member; and
   an unlocking member which is interlocked with the charging member that unlocks the front and rear curtain locking members.

2. The focal plane shuttering apparatus of claim 1, wherein the charging member includes an unlocking portion to unlock the rear curtain locking member in addition to the unlocking member.

3. The focal plane shuttering apparatus of claim 1, further comprising a third elastic member which applies biasing force to urge the front curtain to cover the aperture,
   wherein the front curtain locking member maintains a state in which the front curtain is retracted from the aperture with biasing force applied to the first elastic member, but is ready to exit from the state,
   the first switch is kept OFF in that state maintained, and
   once the front curtain locking member exits from the state, the aperture is able to be kept covered with the front curtain by the third elastic member and the first switch is kept ON.

4. The focal plane shuttering apparatus of claim 1, further comprising a fourth elastic member which applies biasing force to get the rear curtain retracted from the aperture,
   wherein the rear curtain locking member maintains a state in which the aperture is covered with the rear curtain with biasing force applied to the second elastic member, but is ready to exit from the state,
   the second switch is kept OFF in that state maintained, and
   once the rear curtain locking member exits from the state, the rear curtain is able to be kept retracted from the aperture by the fourth elastic member and the second switch is kept ON.

5. The focal plane shuttering apparatus of claim 1, wherein when driving force is transferred from the charging member to the unlocking member, the unlocking member starts to be driven later than the charging member and the second switch turns OFF later than the first switch that has already turned OFF.

6. The focal plane shuttering apparatus of claim 1, comprising:
   a front curtain driving member which is coupled to the front curtain;
   a front curtain setting member which receives force to generate the biasing force applied from the charging member to the first elastic member;
   a third elastic member which applies weaker biasing force than the first elastic member does so that the front curtain driving member contacts with the front curtain setting member; and
   a front curtain locking portion which makes the front curtain locking member prevent the front curtain driving member from following the front curtain setting member under the biasing force applied from the third elastic member when the charging member applies biasing force to the first elastic member,
   wherein the front curtain driving member and the front curtain setting member are able to run together under the biasing force applied from the first elastic member, and
   when the charging member applies biasing force to the first elastic member, the front curtain setting member is driven separately from the front curtain driving member.

7. The focal plane shuttering apparatus of claim 1, comprising:
   a rear curtain driving member which is coupled to the rear curtain;
   a rear curtain setting member which receives force to generate the biasing force applied from the charging member to the second elastic member;
   a fourth elastic member which applies weaker biasing force than the second elastic member does so that the rear curtain driving member contacts with the rear curtain setting member; and
   a rear curtain locking portion which makes the rear curtain locking member prevent the rear curtain driving member from following the rear curtain setting member under the biasing force applied from the fourth elastic member when the charging member applies biasing force to the second elastic member, wherein the rear curtain driving member and the rear curtain setting member are able to run together under the biasing force applied from the second elastic member, and when the charging member applies biasing force to the second elastic member, the rear curtain setting member is driven separately from the rear curtain driving member.

8. The focal plane shuttering apparatus of claim 1, wherein when driving force is transferred from the unlocking member to the charging member, the charging member and the unlocking member start to be driven substantially simultaneously and the first and second switches turn OFF substantially simultaneously.

9. The focal plane shuttering apparatus of claim 2, wherein when the rear curtain locking member unlocks the rear curtain driving member, the unlocking portions of the charging member and the unlocking portions of the unlocking member are arranged at mutually different positions.

10. An image capture device comprising:
the focal plane shuttering apparatus of claim 1; and
an imager configured to capture a subject image that has come through the aperture and to output image data.

* * * * *